US012789646B2

(12) United States Patent
Nakashima et al.

(10) Patent No.: US 12,789,646 B2
(45) Date of Patent: Nov. 10, 2026

(54) BATTERY, METHOD OF MANUFACTURING THE BATTERY, CIRCUIT BOARD, ELECTRONIC DEVICE, AND ELECTRIC VEHICLE

(71) Applicant: Murata Manufacturing Co., Ltd., Nagaokakyo (JP)

(72) Inventors: Mamoru Nakashima, Nagaokakyo (JP); Koichi Nakano, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 1081 days.

(21) Appl. No.: 16/929,718

(22) Filed: Jul. 15, 2020

(65) Prior Publication Data

US 2020/0350524 A1 Nov. 5, 2020

Related U.S. Application Data

(63) Continuation of application No. PCT/JP2019/010033, filed on Mar. 12, 2019.

(30) Foreign Application Priority Data

Mar. 14, 2018 (JP) ................................ 2018-046531

(51) Int. Cl.

| | |
|---|---|
| ***H01M 50/497*** | (2021.01) |
| ***B60L 50/64*** | (2019.01) |

(Continued)

(52) U.S. Cl.

CPC ............... *B60L 50/64* (2019.02); *B60L 58/12* (2019.02); *H01M 10/0525* (2013.01); *H01M 10/0562* (2013.01); *H01M 10/4257* (2013.01); *H01M 10/44* (2013.01); *H01M 50/102* (2021.01); *H01M 50/117* (2021.01); *H01M 50/121* (2021.01); *H01M 50/124* (2021.01); *H01M 50/1245* (2021.01); *H01M 50/474* (2021.01);

(Continued)

(58) Field of Classification Search

CPC ............. H01M 50/102; H01M 50/117; H01M 50/121; H01M 50/124; H01M 50/474; H01M 50/483; H01M 50/497; H01M 10/44; H01M 10/0525; H01M 10/0562; H01M 10/4257; H01M 2220/20; H01M 2300/0071

See application file for complete search history.

(56) References Cited

U.S. PATENT DOCUMENTS

2014/0120409 A1* 5/2014 Ouchi .................. H01M 4/139 429/162

FOREIGN PATENT DOCUMENTS

| | | | | |
|---|---|---|---|---|
| JP | H09237639 A * | 9/1997 | ............ | H01M 10/40 |
| JP | 2007080812 A | 3/2007 | | |

(Continued)

OTHER PUBLICATIONS

Machine Translation (WO 2014/007215 A1) (Year: 2014).*

(Continued)

*Primary Examiner* — Osei K Amponsah

(74) *Attorney, Agent, or Firm* — ArentFox Schiff LLP

(57) ABSTRACT

A battery that includes a battery element, an exterior material covering a surface of the battery element, and an intermediate layer between the battery element and the exterior material and including a solid electrolyte, in which a thickness of the intermediate layer is substantially uniform.

30 Claims, 11 Drawing Sheets

(51) Int. Cl.

| | |
|---|---|
| ***B60L 58/12*** | (2019.01) |
| ***H01M 10/0525*** | (2010.01) |
| ***H01M 10/0562*** | (2010.01) |
| ***H01M 10/42*** | (2006.01) |
| ***H01M 10/44*** | (2006.01) |
| ***H01M 50/102*** | (2021.01) |
| ***H01M 50/117*** | (2021.01) |
| ***H01M 50/121*** | (2021.01) |
| ***H01M 50/124*** | (2021.01) |
| ***H01M 50/474*** | (2021.01) |
| ***H01M 50/483*** | (2021.01) |
| *B60K 6/28* | (2007.10) |
| *H02J 7/82* | (2026.01) |

(52) U.S. Cl.

CPC ....... *H01M 50/483* (2021.01); *H01M 50/497* (2021.01); *B60K 6/28* (2013.01); *B60Y 2200/91* (2013.01); *B60Y 2200/92* (2013.01); *B60Y 2300/91* (2013.01); *H01M 2220/20* (2013.01); *H01M 2300/0071* (2013.01); *H02J 7/82* (2026.01)

(56) References Cited

FOREIGN PATENT DOCUMENTS

| | | | | | |
|---|---|---|---|---|---|
| JP | 2010251077 | A | | 11/2010 | |
| JP | WO 2014/007215 | A1 | * | 1/2014 | .......... H01M 50/141 |
| JP | 2014026944 | A | | 2/2014 | |
| JP | 2015220099 | A | | 12/2015 | |
| JP | 2015220106 | A | | 1/2016 | |
| JP | 2016001601 | A | | 1/2016 | |
| JP | 2016192370 | A | | 11/2016 | |
| JP | 2016201310 | A | | 12/2016 | |
| WO | 2013008677 | A1 | | 1/2013 | |
| WO | 2018186449 | A1 | | 10/2018 | |

OTHER PUBLICATIONS

International Search Report issued for PCT/JP2019/010033, date of mailing Jun. 11, 2019.

Written Opinion of the International Searching Authority issued for PCT/JP2019/010033, date of mailing Jun. 11, 2019.

* cited by examiner

BATTERY, METHOD OF MANUFACTURING THE BATTERY, CIRCUIT BOARD, ELECTRONIC DEVICE, AND ELECTRIC VEHICLE

CROSS REFERENCE TO RELATED APPLICATIONS

The present application is a continuation of International application No. PCT/JP2019/010033, filed Mar. 12, 2019, which claims priority to Japanese Patent Application No. 2018-046531, filed Mar. 14, 2018, the entire contents of each of which are incorporated herein by reference.

FIELD OF THE INVENTION

The present invention relates to a battery, a method of manufacturing the battery, a circuit board, an electronic device, and an electric vehicle.

BACKGROUND OF THE INVENTION

Recently, an all solid state battery whose surface is covered with an exterior material has been studied. For example, Patent Document 1 describes a solid state battery in which a power storage element body including a positive electrode layer, a negative electrode layer, and a solid electrolyte layer is covered with a protective layer. The same document further describes that a solid electrolyte layer is provided as the uppermost layer and the lowermost layer of the power storage element body, and a thickness of a central portion of the solid electrolyte layer is made smaller than a thickness of an end portion thereof.

Patent Document 1: Japanese Patent Application Laid-Open No. 2016-001601

SUMMARY OF THE INVENTION

However, in the all solid state battery having a configuration as described above, foreign matter is mixed into the power storage element body from the exterior material due to a diffusion phenomenon, whereby charge-discharge efficiency may decrease, and internal resistance (DC-IR) may increase.

An object of the present invention is to provide a battery capable of suppressing a decrease in charge-discharge efficiency and an increase in internal resistance, a method of manufacturing the battery, a circuit board including the battery, an electronic device, and an electric vehicle.

In order to solve the above problems, the first invention is a battery including a battery element, an exterior material covering a surface of the battery element, and an intermediate layer between the battery element and the exterior material and including a solid electrolyte, in which a thickness of the intermediate layer is substantially uniform.

In the battery having the above configuration, it is possible to suppress mixing of foreign matter into the battery element from the exterior material due to a diffusion phenomenon, so that it is possible to suppress a decrease in charge-discharge efficiency and an increase in internal resistance.

The reason why the decrease in charge-discharge efficiency can be suppressed is presumed as follows. That is, it is believed that the foreign matter from the exterior material, a substance generated by a reaction between the foreign matter and an electrode material, and the like are prevented from causing an irreversible reaction during charging and discharging. The reason why the increase in internal resistance can be suppressed is considered to be due to suppression of reaction of the foreign matter from the exterior material with a solid electrolyte in an active material layer and suppression of an increase in resistance in the active material layer.

The second invention is a battery including a battery element including an active material layer, an exterior material covering a surface of the battery element, and an intermediate layer between the battery element and the exterior material and including a solid electrolyte, in which a lithium ion conductivity of the intermediate layer is $1\times10^{-8}$ S/cm or more, an average thickness of the intermediate layer is 0.3 μm or more, and a ratio $((T_2/T_1)\times100)$ of an average thickness $T_1$ of the active material layer closest to the intermediate layer and an average thickness $T_2$ of the intermediate layer is 5% or more.

In the battery having the above configuration, it is possible to suppress mixing of foreign matter into the battery element from the exterior material due to a diffusion phenomenon, so that it is possible to suppress a decrease in charge-discharge efficiency and an increase in internal resistance.

The third invention is a battery including a battery element including an active material layer, an exterior material covering a surface of the battery element, and an intermediate layer between the battery element and the exterior material and including a solid electrolyte, in which a lithium ion conductivity of the intermediate layer is $1\times10^{-8}$ S/cm or more, an average thickness of the intermediate layer is 0.5 μm or more, and a ratio $((T_2/T_1)\times100)$ of an average thickness T1 of the active material layer closest to the intermediate layer and an average thickness T2 of the intermediate layer is 2.5% or more.

In the battery having the above configuration, it is possible to suppress mixing of foreign matter into the battery element from the exterior material due to a diffusion phenomenon, so that it is possible to suppress a decrease in charge-discharge efficiency and an increase in internal resistance.

The fourth invention is a battery including a battery element including an active material layer, an exterior material covering a surface of the battery element, and an intermediate layer between the battery element and the exterior material and including a solid electrolyte, in which a lithium ion conductivity of the intermediate layer is $1\times10^{-8}$ S/cm or more, and a ratio $((T_2/T_1)\times100)$ of an average thickness $T_1$ of the active material layer closest to the intermediate layer and an average thickness $T_2$ of the intermediate layer is 5% or more, or an average thickness of the intermediate layer is 0.5 μm or more.

In the battery having the above configuration, it is possible to suppress mixing of foreign matter into the battery element from the exterior material due to a diffusion phenomenon, so that it is possible to suppress a decrease in charge-discharge efficiency and an increase in internal resistance.

In the first to fourth inventions, in order to further suppress the decrease in charge-discharge efficiency and the increase in internal resistance, the lithium ion conductivity of the intermediate layer is preferably $1\times10^{-7}$ S/cm or more.

In the first to fourth inventions, in order to further suppress the decrease in charge-discharge efficiency and the increase in internal resistance, the ratio $((T_2/T_1)\times100)$ is preferably 10% or more.

In the first to fourth inventions, in order to further suppress the decrease in charge-discharge efficiency and the increase in internal resistance, the average thickness of the intermediate layer is preferably 1 μm or more. The intermediate layer preferably has the function of a protective layer. With this configuration, it is possible to suppress mixing of foreign matter into the battery element from a side of the exterior material.

In the first to fourth inventions, the exterior material preferably contains a ceramic. Due to the fact that the exterior material contains ceramics, it is possible to suppress a side reaction on a surface of the exterior material and maintain and improve a charge-discharge capacity. This is considered to be due to the following reason. It is known that when a cell in which an exterior material is formed by an electrolyte alone (not containing ceramics) is charged and discharged, a certain kind of side reaction occurs on a surface of the exterior material, causing discoloration and loss during charging and discharging. When ceramics are contained, discoloration on the surface of the exterior material disappears, and loss during charging and discharging disappears or is reduced. That is, the charge-discharge capacity is maintained and improved.

In the first to fourth inventions, the battery according to the present invention may further include an outermost exterior material covering at least a part of the battery element and the exterior material. The outermost exterior material preferably contains at least one material selected from an epoxy resin, a polyimide resin, a silicone resin, silicon oxide, and silicon nitride.

In the first to fourth inventions, the battery element includes a first electrode layer, a second electrode layer, and a solid electrolyte layer between the first electrode layer and the second electrode layer.

Electrode layers having the same polarity or different polarities may be located at opposed ends of the battery element in a stacking direction (thickness direction).

In the first to fourth inventions, the battery element includes a plurality of alternating first electrode layers, second electrode layers, and solid electrolyte layers such that a respective solid electrolyte layer of the solid electrolyte layers is between each opposed first electrode layer and second electrode layer of the plurality of alternating first electrode layers and second electrode layers, the second electrode layer includes the active material layer, and the average thickness $t_1$ of the second electrode layer provided at other than the opposed ends and the average thickness $t_2$ of the second electrode layer provided at the opposed ends preferably satisfy a relationship $t_1 \times (1/3) \leq t_2 \leq t_1 \times (2/3)$.

In the first to fourth inventions, the battery element includes a plurality of alternating first electrode layers, second electrode layers, and solid electrolyte layers such that a respective solid electrolyte layer of the solid electrolyte layers is between each opposed first electrode layer and second electrode layer of the plurality of alternating first electrode layers and second electrode layers, and the first electrode layers provided at the opposed ends preferably include a current collector layer and the active material layer.

According to each of the above configurations, between the second electrode layers (or the first electrode layers) provided at opposed ends of the battery element in the stacking direction and the first electrode layers (or the second electrode layers) provided facing the second electrode layers (or the first electrode layers), lithium deposition or shortage of irreversible lithium can be suppressed during charging. Therefore, an initial capacity or the charge-discharge efficiency can be improved.

In the first to fourth inventions, the battery element includes a plurality of alternating first electrode layers, second electrode layers, and solid electrolyte layers such that a respective solid electrolyte layer of the solid electrolyte layers is between each opposed first electrode layer and second electrode layer of the plurality of alternating first electrode layers and second electrode layers, the first electrode layer is arranged at a first end of the battery element in the stacking direction, the second electrode layer is arranged at a second end of the battery element in the stacking direction, the first electrode layer at the first end includes a current collector layer and an active material layer, the second electrode layer at the second end is composed of the active material layer, and the average thickness $t_1$ of the second electrode layer provided at other than the second end and the average thickness $t_2$ of the second electrode layer provided at the second end preferably satisfy a relationship $t_1 \times (1/3) \leq t_2 \leq t_1 \times (2/3)$.

In the first to fourth inventions, the battery element includes a plurality of alternating first electrode layers, second electrode layers, and solid electrolyte layers such that a respective solid electrolyte layer of the solid electrolyte layers is between each opposed first electrode layer and second electrode layer of the plurality of alternating first electrode layers and second electrode layers, the first electrode layer is arranged at a first end of the battery element in the stacking direction, the second electrode layer is arranged at the second end of the battery element in the stacking direction, the first electrode layer at first end preferably includes a first current collector layer and a first active material layer, and the second electrode layer at the second end preferably includes a second current collector layer and a second active material layer.

According to each of the above configurations, between the first electrode layer provided at one end of the battery element in the stacking direction and the second electrode layer provided facing the first electrode layer, lithium deposition or irreversible shortage of lithium can be suppressed during charging. The same applies between the second electrode layer provided at the other end of the battery element in the stacking direction and the first electrode layer provided facing the second electrode layer. Therefore, the initial capacity and the charge-discharge efficiency can be improved.

In each of the above configurations, although the second electrode layer does not particularly require a current collector layer, the active material layer may also function as the current collector layer. When the electrode layer provided at opposed ends or one end of the battery element includes a current collector layer, the active material layer is preferably provided on one of both main surfaces of the current collector layer, which faces the electrode layer having other polarity. In each of the above configurations, the expressions "opposed ends" and "first end" or "second end" do not necessarily mean an extreme end of the battery element in the stacking direction, and other members such as an exterior material and an outermost exterior material, which will be described later, may be provided outside the electrode layer.

In the first to fourth inventions, the first electrode layer may be a positive electrode layer, the second electrode layer may be a negative electrode layer, the first electrode layer may be a negative electrode layer, and the second electrode layer may be a positive electrode layer. However, in a typical battery configuration, the first electrode layer is a positive electrode layer, and the second electrode layer is a negative electrode layer.

In the first to fourth inventions, the solid electrolyte preferably contains oxide glass containing lithium (Li), silicon (Si), and boron (B).

In oxide glass containing the above elements, a low glass transition temperature (for example, 550° C. or lower, preferably 500° C. or lower) is obtained. Therefore, since the oxide glass can be sintered at a low temperature, it is possible to widen choices of materials that can be used for manufacturing a battery.

In the first to fourth inventions, the glass transition temperature of the oxide glass is preferably 550° C. or lower.

When the glass transition temperature is 550° C. or lower, a carbon material can be used as a battery material. For example, the carbon material can be used as a negative electrode active material. Thus, an energy density of the battery can be improved. When the active material layer contains a conductive auxiliary agent, a carbon material can be used as the conductive auxiliary agent. Therefore, a good electron conduction path can be formed in the active material layer, and electric conductivity of the active material layer can be improved.

The battery according to any one of the first to fourth inventions is mounted on a circuit board according to the fifth invention. A charge and discharge control unit may be further mounted on the circuit board according to the fifth invention.

An electronic device according to the sixth invention includes the battery according to any one of the first to fourth inventions or the circuit board according to the fifth invention, and receives a supply of electric power from the battery.

An electric vehicle according to the seventh invention includes the battery according to any one of the first to fourth inventions and a converter that receives a supply of electric power from the battery and converts the power into a driving force for the vehicle.

The electric vehicle according to the seventh invention may further include a controller that performs information processing regarding vehicle control based on information regarding the battery.

The eighth invention is a method of manufacturing a battery, the method including forming n first coating layers (where n is an integer of 1 or more) to produce a first electrode layer precursor, forming 2n second coating layers to produce a second electrode layer precursor, and alternately stacking the n first coating layers and the 2n second coating layers with a solid electrolyte layer therebetween such as to produce a stacked structure having the first electrode layer precursor provided at a first end or opposed ends of the battery in a stacking direction and having the second electrode layer precursor provided at other than the opposed ends of the battery in the stacking direction.

According to the method of manufacturing a battery described above, a difference in thickness between the first electrode layer provided at one end or opposed ends of the battery in the stacking direction and the first electrode layer provided at other than both the ends of the battery in the stacking direction can be set by a difference in number of layers between the first coating layer and the second coating layer, that is, a difference in number of times the coating material is applied.

In the eighth invention, the first electrode layer is preferably composed of an active material layer which also serves as a current collector layer. In this case, the first electrode layer is preferably the negative electrode layer. When the first electrode layer is the active material layer which also serves as the current collector layer, the battery manufacturing method can be simplified.

In the eighth invention, a thickness of the first coating layer per layer and a thickness of the second coating layer per layer are preferably the same or substantially the same. Consequently, simply by changing the number of times a first electrode layer producing coating material is applied, a thickness of the electrode layer precursor of the battery can be easily adjusted. For example, the thickness of the first electrode layer precursor (and after drying) provided at one end or opposed ends of the battery in the stacking direction is preferably half or almost half the thickness of the first electrode layer precursor (and after drying) provided at other than both the opposed ends.

According to the present invention, the decrease in charge-discharge efficiency and the increase in internal resistance can be suppressed. The effects described herein are non-limiting, and may be any one of effects described in the present invention or may be different therefrom.

DETAILED DESCRIPTION OF PREFERRED EMBODIMENTS OF THE INVENTION

Embodiments, Examples, and Application Examples of the present invention will be described in the following order.

Note that the same or corresponding portions in each of the drawings for the following embodiments, Examples, and Application Examples are denoted by the same reference symbols.

1 First Embodiment
1.1 Battery Configuration
1.2 Operation of Battery
1.3 Method of Manufacturing Battery
1.4 Effect
2. Second Embodiment
2.1 Configuration of Battery
2.2 Method of Manufacturing Battery
2.3 Effect
3. Third Embodiment
3.1 Configuration of Battery
3.2 Manufacture of Battery
3.3 Effect
4 Modification Example
5 Example
5.1 Example and Comparative Example Studying Intermediate Layer
5.2 Example Studying Average Thickness of Electrodes Located at Opposed Ends of Battery Element
6 Application Example
6.1 Printed Circuit Board As Application Example
6.2 Wristband-Type Electronic Device As Application Example
6.3 Hybrid Vehicle As Application Example

1. First Embodiment

[1.1 Battery Configuration]

Figure 1A:
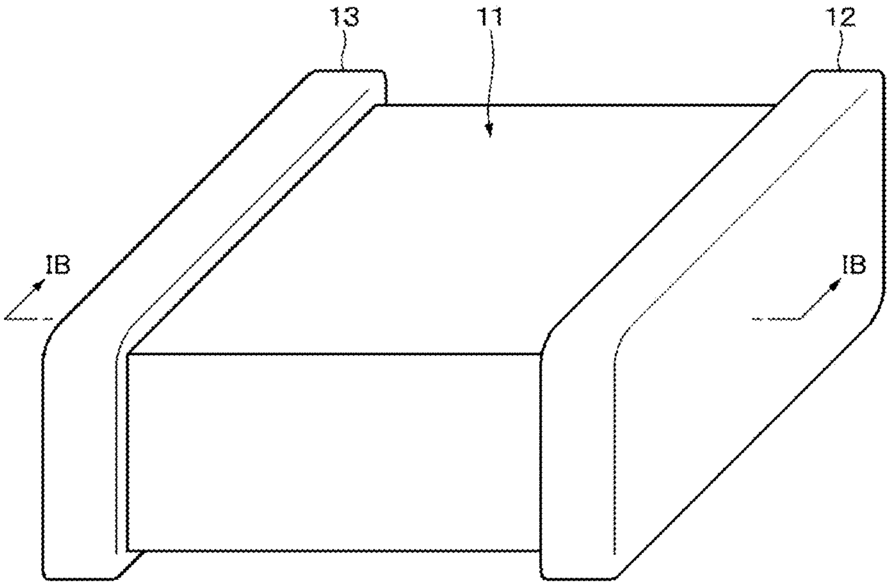
FIG. 1A is a perspective view showing an example of an appearance of a battery according to a first embodiment of the present invention.
Figure 1B:
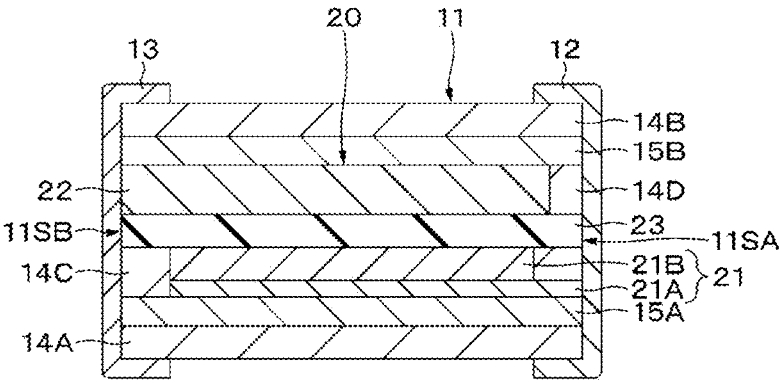
FIG. 1B is a cross-sectional view taken along line IB-IB of FIG. 1A.

A battery according to a first embodiment of the present invention is a so-called bulk-type battery, and, as shown in FIGS. 1A and 1B, the battery includes an exterior battery element 11 having a rectangular plate shape, a positive electrode terminal 12 provided on a first end face 11SA of the exterior battery element 11, and a negative electrode terminal 13 provided on a second end face 11SB of the exterior battery element 11 facing the first end face 11SA.

This battery is an all-solid-state secondary battery in which the battery capacity can be repeatedly obtained by exchanging an electrode reactant Li, and specifically for example, it is an all-solid-state lithium ion secondary battery in which the capacity of the negative electrode can be obtained by occluding and releasing a lithium ion or is an all-solid-state lithium metal secondary battery in which the capacity of the negative electrode can be obtained by precipitating and dissolving lithium metal.

(Exterior Battery Element)

Figure 2:
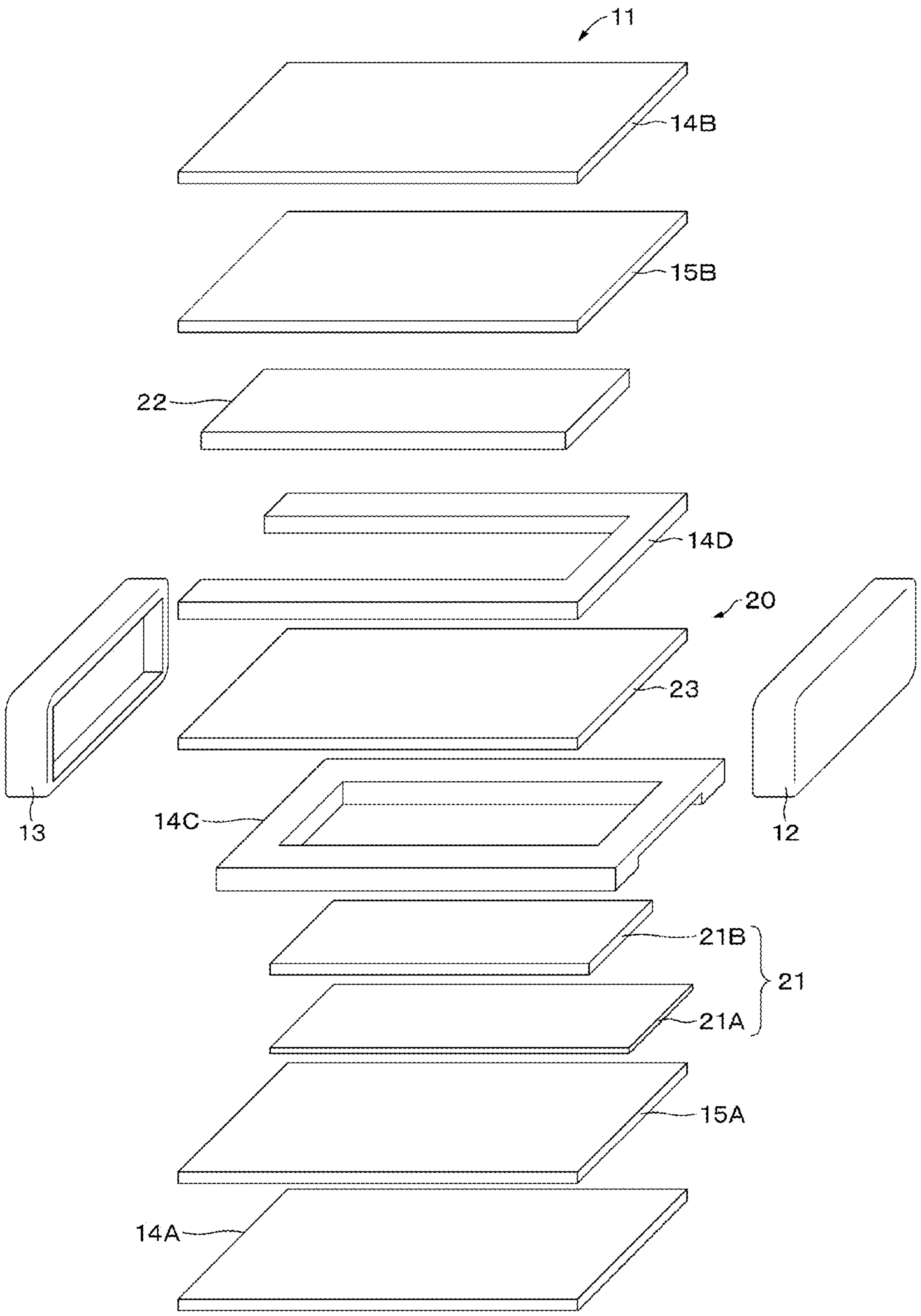
FIG. 2 is an exploded perspective view showing an example of a battery configuration according to the first embodiment of the present invention.

As shown in FIGS. 1B and 2, the exterior battery element 11 includes a rectangular plate-shaped battery element (battery body) 20, exterior materials 14A and 14B covering first and second main surfaces of the battery element 20, respectively, exterior materials 14C and 14D covering a side surface of the battery element 20, an intermediate layer 15A provided between the first main surface of the battery element 20 and the exterior material 14A, and an intermediate layer 15B provided between the second main surface of the battery element 20 and the exterior material 14B.

(Battery Element)

The battery element 20 includes a positive electrode layer 21, a negative electrode layer 22, and a solid electrolyte layer 23 provided between the positive electrode layer 21 and the negative electrode layer 22. Each of the positive electrode layer 21, the negative electrode layer 22, and the solid electrolyte layer 23 has a rectangular plate shape. The positive electrode layer 21 includes a positive electrode current collector layer 21A and a positive electrode active material layer 21B provided on the main surface on the side opposite to the negative electrode layer 22 of both the main surfaces of the positive electrode current collector layer 21A.

(Solid Electrolyte Layer)

The solid electrolyte layer 23 contains an oxide-based inorganic solid electrolyte. Since the solid electrolyte layer 23 contains the oxide-based inorganic solid electrolyte, stability of the solid electrolyte layer 23 with respect to the atmosphere (water) can be improved. The oxide-based inorganic solid electrolyte preferably contains Li-containing oxide glass. Here, glass refers to those being crystallographically amorphous, where a halo is observed in X-ray diffraction, electron beam diffraction, or the like. The oxide-based inorganic solid electrolyte is preferably sintered. This is because the strength and a lithium ion conductivity of the solid electrolyte layer 23 can be improved.

The lithium ion conductivity of the solid electrolyte layer 23 is preferably $10^{-7}$ S/cm or more, more preferably $10^{-6}$ S/cm or more, from the viewpoint of improving battery performance. The lithium ion conductivity of the solid electrolyte layer 23 is obtained by the alternating current impedance method as follows. First, the solid electrolyte layer 23 is taken out from the battery by ion milling, polishing, or the like. Next, a measurement sample is prepared by forming an electrode made of Au (gold) at both ends of the taken-out solid electrolyte layer 23. Subsequently, alternating current impedance measurement (frequency: $10^{+6}$ Hz to $10^{-1}$ Hz, Voltage: 100 mV, 1000 mV) is performed on the measurement sample at room temperature (25° C.) using an impedance measuring device (manufactured by Toyo Technica Inc.), thereby creating a Cole-Cole plot. Subsequently, the lithium ion conductivity is obtained from this Cole-Cole plot.

A glass transition temperature of a lithium-containing oxide glass is preferably 550° C. or lower, more preferably 300° C. or higher and 550° C. or lower, and even more preferably 300° C. or higher and 500° C. or lower. When the glass transition temperature is 550° C. or lower, burn-off of carbon material is suppressed in a sintering process, so that it is possible to use a carbon material as a negative electrode active material. Accordingly, an energy density of the battery can be further improved.

When the positive electrode active material layer 21B contains a conductive auxiliary agent, a carbon material can be used as the conductive auxiliary agent. Thus, a good electron conduction path can be formed in the positive electrode active material layer 21B, and electric conductivity of the positive electrode active material layer 21B can be improved. Even when the negative electrode layer 22 contains a conductive auxiliary agent, a carbon material can be used as the conductive auxiliary agent, so that the electric conductivity of the negative electrode layer 22 can be improved.

When the glass transition temperature is 550° C. or lower, it is possible to suppress the formation of by-products such as passivation (state in which an oxide film that resists corrosive action is generated on a metal surface) by reacting the lithium-containing oxide glass and the electrode active material in the sintering process. Accordingly, deterioration of the battery characteristics can be suppressed. When the glass transition temperature is as low as 550° C. or lower, the range of choice of the type of the electrode active material is widened, thereby improving the degree of freedom of battery design.

On the other h and, when the glass transition temperature is 300° C. or higher, it is possible to burn off a common binder such as an acrylic resin contained in the positive electrode layer precursor, the negative electrode layer precursor, and the solid electrolyte layer precursor in the sintering process. By virtue of the fact that such an organic binder is substantially not contained, the lithium ion conductivity can be improved in at least one of the positive electrode layer 21, the negative electrode layer 22, and the solid electrolyte layer 23.

As the lithium-containing oxide glass, those containing at least one of Ge, Si, B, and P, Li, and O (Oxygen) are preferable, and those containing Si, B, Li, and O are more preferable. Specifically, those containing at least one of germanium oxide ($GeO_2$), silicon oxide ($SiO_2$), boron oxide ($B_2O_3$), and phosphorus oxide ($P_2O_5$) and lithium oxide ($Li_2O$) are preferable, and those containing $SiO_2$, $B_2O_3$, and $Li_2O$ are more preferable.

Lithium-containing oxide glass having the above composition has a low glass transition temperature (for example, 550° C. or lower, preferably 500° C. or lower). Since the lithium-containing oxide glass has a high thermal shrinkage ratio and a rich fluidity, it is possible to form a good interface between the positive electrode layer 21 and the solid electrolyte layer 23 and between the negative electrode layer 22 and the solid electrolyte layer 23 and to reduce interface resistance between the positive electrode layer 21 and the solid electrolyte layer 23 and between the negative electrode layer 22 and the solid electrolyte layer 23.

From the viewpoint of lowering the glass transition temperature of the lithium-containing oxide glass, the content of $Li_2O$ is preferably 20 mol % to 75 mol %, more preferably 30 mol % to 75 mol %, still more preferably 40 mol % to 75 mol %, and particularly preferably 50 mol % to 75 mol %.

When the lithium-containing oxide glass contains $GeO_2$, the content of $GeO_2$ is preferably more than 0 mol % and 80 mol % or less. When the lithium-containing oxide glass contains $SiO_2$, the content of $SiO_2$ is preferably more than 0 mol % and 70 mol % or less. When the lithium-containing oxide glass contains $B_2O_3$, the content of $B_2O_3$ is preferably more than 0 mol % and 60 mol % or less. When the lithium-containing oxide glass contains $P_2O_5$, the content of $P_2O_5$ is preferably more than 0 mol % and 50 mol % or less.

The content of each of the oxides described above is the content of each of the oxides in the lithium-containing oxide glass. Specifically, the proportion of the content (mol) of each of the oxides with respect to the total amount (mol) of the content of each of the oxides described above is shown as a percentage (mol %). The content of each of the oxides can be measured using inductively coupled plasma atomic emission spectroscopy (ICP-AES) or the like.

The lithium-containing oxide glass may further contain an additional element if necessary. The additional element is, for example, at least one of Na, Mg, Al, K, Ca, Ti, V, Cr, Mn, Fe, Co, Ni, Cu, Zn, Ga, Se, Rb, S, Y, Zr, Nb, Mo, Ag, In, Sn, Sb, Cs, Ba, Hf, Ta, W, Pb, Bi, Au, La, Nd and Eu. The lithium-containing oxide glass may contain, as an oxide, at least one of these additional elements.

(Positive Electrode Current Collector Layer)

The positive electrode current collector layer 21A contains a conductive particle powder and an inorganic binder. The conductive particles include, for example, at least one kind of carbon particles and metal particles. As the carbon particles, for example, at least one of graphite, carbon fiber, carbon black, carbon nanotube, and the like can be used. As the carton fibers, for example, vapor growth carbon fibers (VGCFs) and the like can be used. As the carbon black, for example, at least one of acetylene black, ketjen black, and the like can be used. As the carbon nanotubes, for example, single-wall carbon nanotubes (SWCNTs), multi-wall carbon nanotubes (MWCNTs) such as double-wall carbon nanotubes (DWCNTs) and the like can be used. As the metal particles, for example, Ni particles or the like can be used. However, the conductive particles are not particularly limited to those described above.

The inorganic binder preferably contains lithium-containing oxide glass. The lithium-containing oxide glass is preferably sintered. The lithium-containing oxide glass is preferably the same as the lithium-containing oxide glass contained in the solid electrolyte layer 23. However, the components or compositions of the lithium-containing oxide glass contained in the positive electrode current collector layer 21A and the solid electrolyte layer 23 may be the same or different.

The positive electrode current collector layer 21A may be a metal layer containing, for example, Al, Ni, stainless steel, and the like. The shape of the metal layer is, for example, a foil shape, a plate shape, a mesh shape, or the like.

(Positive Electrode Active Material Layer)

The positive electrode active material layer 21B contains a positive electrode active material and a solid electrolyte. The solid electrolyte may have a function as a binder. The positive electrode active material layer 21B may further contain a conductive auxiliary agent, if necessary.

The positive electrode active material contains, for example, a positive electrode material capable of occluding and releasing a lithium ion, which is an electrode reactant. From the viewpoint of obtaining a high energy density, the positive electrode material is preferably a lithium-containing compound or the like but not limited thereto. The lithium-containing compound is, for example, at least one of a composite oxide (lithium transition metal composite oxide) containing lithium and a transition metal element as constituent elements, a phosphate compound (lithium transition metal phosphate compound) containing lithium and a transition metal element as constituent elements, and the like. Among them, the transition metal element is preferably any one or two or more of Co, Ni, Mn, and Fe. Due to this, when a higher voltage (for example, 4.2 V or higher) is obtained. When the voltage of the battery can be increased, the capacity of the battery can be increased.

The lithium transition metal composite oxide is expressed by, for example, $Li_xM1O_2$, $Li_yM2O_4$, or the like. More specifically, for example, the lithium transition metal composite oxide is $LiCoO_2$, $LiNiO_2$, $LiVO_2$, $LiCrO_2$, $LiMn_2O_4$, or the like. Further, the lithium transition metal phosphate compound is expressed by, for example, $Li_zM3PO_4$ or the like. More specifically, for example, the lithium transition metal phosphate compound is $LiFePO_4$, $LiCoPO_4$, or the like. However, M1 to M3 are one or two or more types of transition metal elements, and the values of x to z are arbitrary.

In addition to this, the positive electrode active material may be, for example, an oxide, a disulfide, a chalcogenide, a conductive polymer, or the like. The oxide is, for example, titanium oxide, vanadium oxide, manganese dioxide, or the like. The disulfide is, for example, titanium disulfide, molybdenum sulfide, or the like. The chalcogenide is, for example, niobium selenide or the like. Examples of the conductive polymer are disulfide, polypyrrole, polyaniline, polythiophene, polyparastylene, polyacetylene, polyacene, or the like.

The solid electrolyte contained in the positive electrode active material layer 21B preferably contains lithium-containing oxide glass as the oxide-based inorganic solid electrolyte. The lithium-containing oxide glass is preferably the same as the lithium-containing oxide glass contained in the solid electrolyte layer 23. However, the components or compositions of the lithium-containing oxide glass contained in the positive electrode active material layer 21B and the solid electrolyte layer 23 may be the same or different.

The conductive auxiliary agent is, for example, at least one of a carbon material, a metal, a metal oxide, a conductive polymer, and the like. As the carbon material, for example, at least one of graphite, carbon fiber, carbon black, carbon nanotube, and the like can be used. As carbon fiber, carbon black, and carbon nanotube, for example, the same materials as those for the positive electrode current collector layer 21A described above can be used. As the metal, for example, Ni powder or the like can be used. As the metal oxide, for example, $SnO_2$ or the like can be used. As the conductive polymer, for example, at least one of substituted or unsubstituted polyaniline, polypyrrole, polythiophene, (co)polymers composed of one or two selected from these, and the like can be used. The conductive auxiliary agent may be a material having conductivity, and is not limited to the above-described examples.

(Negative Electrode Layer)

The negative electrode layer 22 has a configuration without a current collector layer, and is specifically composed of a negative electrode active material layer which also serves as a negative electrode current collector layer. In the present invention, an electrode layer without a current collector layer is defined as included in the active material layer. The negative electrode layer 22 contains a negative electrode active material and a solid electrolyte. The solid electrolyte may have a function as a binder. The negative electrode layer 22 may further contain a conductive auxiliary agent, if necessary.

The negative electrode active material also has a function of a conductive agent. Specifically, it is preferable that the negative electrode active material be capable of occluding and releasing a lithium ion, which is an electrode reactant, and has the electric conductivity. The negative electrode active material having such a function preferably contains a carbon material. The carbon material preferably contains at least one of graphite, acetylene black, ketjen black, and carbon fiber from the viewpoint of obtaining the high energy density and the high electric conductivity, and among these carbon materials, the carbon material particularly preferably contains the graphite. The negative electrode layer 22 may further contain a metal-based material as a conductive auxiliary agent. Although not shown, the positive electrode layer 21 may include only the positive electrode active material layer 21B, and the positive electrode active material layer 21B may also serve as the positive electrode current collector layer 21A.

The solid electrolyte contained in the negative electrode layer 22 preferably contains lithium-containing oxide glass as the oxide-based inorganic solid electrolyte. The lithium-containing oxide glass is preferably the same as the lithium-containing oxide glass contained in the solid electrolyte layer 23. However, the components or compositions of the lithium-containing oxide glass contained in the negative electrode layer 22 and the solid electrolyte layer 23 may be the same or different.

As the conductive auxiliary agent, those similar to the conductive auxiliary agent contained in the positive electrode active material layer 21B described above can be exemplified.

(Exterior Material)

The exterior materials 14A and 14B cover the first and second main surfaces of the battery element 20, respectively. The exterior material 14C covers a side surface of the positive electrode layer 21 so that the first end face of the positive electrode current collector layer 21A is exposed from the first end face 11SA of the exterior battery element 11. The exterior material 14D covers a side surface of the negative electrode layer 22 so that the second end face of the negative electrode layer 22 is exposed from the second end face 11SB of the exterior battery element 11. Since the surface of the battery element 20 is covered with the exterior materials 14A to 14D in this way, it is possible to suppress moisture permeation into the battery element 20. Accordingly, it is possible to suppress performance deterioration of the battery during long-term storage.

The exterior materials 14A to 14D include ceramics. It is preferable that the exterior materials 14A to 14D further include a particle powder. When the exterior materials 14A to 14D include a particle powder, a contraction of the exterior materials 14A to 14D is suppressed in a firing process of the exterior materials 14A to 14D (at the time of cooling after firing, and the like), and a difference in a contraction ratio between the battery element 20 and the exterior materials 14A to 14D can be reduced. Accordingly, it is possible to suppress distortion and cracking of the exterior materials 14A to 14D in the firing process of the exterior materials 14A to 14D.

Ceramics has, for example, a glass state. The ceramics contains, for example, at least one of B, Bi, Te, P V, Sn, Pb, and Si. More specifically, for example, the ceramics is an oxide containing at least one of B, Bi, Te, P V, Sn, Pb and Si. Ceramics is, for example, a material different from the solid electrolyte contained in the positive electrode active material layer 21B and the negative electrode layer 22.

The particles include at least one of metal oxide, metal nitride and metal carbide. Here, the metal is defined as including semimetal. More specifically, the particles include at least one of $Al_2O_3$ (aluminum oxide: alumina), $SiO_2$ (silicon oxide: quartz), SiN (silicon nitride), AlN (aluminum nitride) and SiC (silicon carbide). The particle powder may contain one kind of particles, or may contain two or more kinds of particles.

The exterior materials 14A to 14D may include an inorganic binder. The inorganic binder preferably contains lithium-containing oxide glass. The lithium-containing oxide glass is preferably the same as the lithium-containing oxide glass contained in the positive electrode current collector layer 21A. However, the composition (type of material) or the composition ratio of the lithium-containing oxide glass contained in the exterior materials 14A to 14D and the positive electrode current collector layer 21A may be the same or may be different.

From the viewpoint of suppressing performance deterioration of the battery during long-term storage, moisture permeability of the exterior materials 14A to 14D is preferably 1 $g/m^2$/day or less, more preferably 0.75 $g/m^2$/day or less, and still more preferably 0.5 $g/m^2$/day or less.

The moisture permeability of the exterior materials 14A to 14D described above is obtained as follows. First, a part of the exterior materials 14A to 14D is taken out as a rectangular plate-like piece from the battery by ion milling, polishing, or the like. Next, the moisture vapor transmission rates (23° C., 90% RH) of the exterior materials 14A to 14D are measured in conformity with JIS K 7129-C (ISO 15106-4).

From the viewpoint of suppressing the self-discharge of the battery, the lithium ion conductivity of each of the exterior materials 14A to 14D is preferably $1\times10^{-8}$ S/cm or less. The lithium ion conductivities of the exterior materials 14A to 14D can be obtained in the same manner as the method of measuring the lithium ion conductivity of the solid electrolyte layer 23 described above, except that a part of the exterior materials 14A to 14D is taken out as a rectangular plate-shaped small piece from the battery by ion milling, polishing, or the like, and a measurement sample is prepared using this.

From the viewpoint of suppressing the self-discharge of the battery, the electric conductivity (electronic conductivity) of the exterior materials 14A to 14D is preferably $1\times10^{-8}$ S/cm or less. The electric conductivity of the exterior materials 14A to 14D described above is obtained as follows. First, a sample is prepared in the same manner as the lithium ion conductivity measurement method described above. Next, using the prepared sample, the electric conductivity is determined at room temperature (25° C.) by a two-terminal method.

From the viewpoint of improving the energy density of the battery, the average thickness of the exterior materials 14A to 14D is preferably 50 μm or less, more preferably 40 μm or less, and still more preferably 30 μm or less. The average thickness of the exterior materials 14A to 14D described above is obtained as follows. First, cross-sections of the exterior materials 14A to 14D are prepared by FIB (Focused Ion Beam) or the like, and a cross-sectional SEM (Scanning Electron Microscope) image is photographed. Next, ten points are randomly selected from the cross-sectional SEM image, a thickness of the exterior materials 14A to 14D is measured at each of the points, and these measurement values are simply averaged (arithmetic mean), thereby determining the average thickness of the exterior materials 14A to 14D.

(Outermost Exterior Material)

The battery according to the first embodiment may further include an outermost exterior material (not shown). The outermost exterior material covers the battery element (stacked structure) 20 including the positive electrode layer 21, the negative electrode layer 22, and the solid electrolyte layer 23 and at least a part of the exterior materials 14A to 14D covering the surface of the battery element 20. The outermost exterior material preferably contains at least one selected from an epoxy resin, a polyimide resin, a silicone resin, silicon oxide, and silicon nitride. The outermost exterior material may be multi-layered. For example, a three-layer structure of an epoxy resin layer, a silicon oxynitride film (SiON), and a polyimide silicone (PIS) resin layer can be adopted from the outside to the inside of the battery. In particular, by including a silicon nitride component, passivation effect against moisture and foreign matter can be further enhanced.

From the viewpoint of further suppressing performance deterioration of the battery during long-term storage, moisture permeability of the outermost exterior material is preferably 1 $g/m^2$/day or less, more preferably 0.75 $g/m^2$/day or less, and still more preferably 0.5 $g/m^2$/day or less.

The moisture permeability of the outermost exterior material is obtained as follows. First, a part of the outermost exterior material is taken out as a rectangular plate-like piece from the battery by ion milling, polishing, or the like. Next, the moisture vapor transmission rate (23° C., 90% RH) of the outermost exterior material is measured in conformity with JIS K 7129-C (ISO 15106-4).

(Positive Electrode Terminal and Negative Electrode Terminal)

The positive electrode terminal 12 and the negative electrode terminal 13 include, for example, a conductive particle powder. The conductive particles may be sintered. The positive electrode terminal 12 and the negative electrode terminal 13 may further contain glass as an inorganic binder, if necessary. The glass may be sintered.

Examples of the shape of the conductive particles include, but are not particularly limited to, a spherical shape, an oval shape, a needle shape, a plate shape, a scaly shape, a tube shape, a wire shape, a rod shape, and an irregular shape and the like. Two or more particles having the above-mentioned shapes may be combined.

The conductive particles are metal particles, metal oxide particles or carbon particles. Here, the metal is defined as including semimetal. Examples of the metal particles include, but are not limited to, those containing at least one of Ag, Pt, Au, Ni, Cu, Pd, Al, and Fe.

Examples of the metal oxide particles include, but are not limited to, those containing indium tin oxide (ITO), zinc oxide, indium oxide, antimony added tin oxide, fluorine added tin oxide, aluminum added zinc oxide, gallium added zinc oxide, silicon added zinc oxide, zinc oxide-tin oxide series, indium oxide-tin oxide series, zinc oxide-indium oxide-magnesium oxide series, and the like.

Examples of the carbon particles include, but are not limited to, carbon black, porous carbon, carbon fiber, fullerene, graphene, carbon nanotube, carbon microcoil, and nanohorn.

The glass includes, for example, oxide glass. The oxide glass is preferably the same as the oxide glass contained in the solid electrolyte layer 23. However, the components or compositions of the oxide glass contained in the positive electrode terminal 12, the negative electrode terminal 13, and the positive electrode current collector layer 21A may be the same or different.

(Intermediate Layer)

The intermediate layers 15A and 15B include a solid electrolyte. The solid electrolyte preferably contains lithium-containing oxide glass as the oxide-based inorganic solid electrolyte. The lithium-containing oxide glass is preferably the same as the lithium-containing oxide glass contained in the solid electrolyte layer 23. However, the components or compositions of the lithium-containing oxide glass contained in the intermediate layers 15A and 15B and the solid electrolyte layer 23 may be the same or different.

The intermediate layers 15A and 15B preferably have a substantially uniform thickness. Here, the expression "substantially uniform" means that a difference $\Delta Wz$ ($=Wz1-Wz2$) between the maximum height Wz1 and the minimum height Wz2 of surfaces of the intermediate layers 15A and 15B is 5 μm or less.

The intermediate layer 15A and, of the active material layers included in the battery element 20, the positive electrode active material layer 21B closest to the intermediate layer 15A satisfy the following characteristics (A1), (A2), and (A3). Consequently, it is possible to suppress mixing of foreign matter into the positive electrode active material layer 21B from the exterior material 14A due to a diffusion phenomenon, so that it is possible to suppress a decrease in charge-discharge efficiency and an increase in internal resistance.

(A1) The lithium ion conductivity of the intermediate layer 15A is $1\times10^{-8}$ S/cm or more.

(A2) An average thickness $TA_2$ of the intermediate layer 15A is 0.3 μm or more.

(A3) Of the active material layers included in the battery element 20, a ratio RA ($=(TA_2/TA_1)\times100$) of an average thickness $TA_1$ of the positive electrode active material layer 21B closest to the intermediate layer 15A and an average thickness $TA_2$ of the intermediate layer 15A is 5% or more.

The intermediate layer 15B and, of the active material layers included in the battery element 20, the negative electrode layer 22 which is a negative electrode active material layer closest to the intermediate layer 15B satisfy the following characteristics (B1), (B2), and (B3). Consequently, it is possible to suppress mixing of foreign matter into the negative electrode layer 22 from the exterior material 14B due to a diffusion phenomenon, so that it is possible to suppress the decrease in charge-discharge efficiency and the increase in internal resistance.

(B1) The lithium ion conductivity of the intermediate layer 15B is $1\times10^{-8}$ S/cm or more.

(B2) An average thickness $TB_2$ of the intermediate layer 15B is 0.3 μm or more.

(B3) Of the active material layers included in the battery element 20, a ratio RB ($=(TB_2/TB_1)\times100$) of an average thickness $TB_1$ of the negative electrode layer 22, which is the negative electrode active material layer closest to the intermediate layer 15B, and an average thickness $TB_2$ of the intermediate layer 15B is 5% or more.

In order to further suppress the decrease in charge-discharge efficiency and the increase in internal resistance, the lithium ion conductivities of the intermediate layers 15A and 15B are preferably $1\times10^{-7}$ S/cm or more.

In order to further suppress the decrease in charge-discharge efficiency and the increase in internal resistance, the respective average thicknesses $TA_2$ and $TB_2$ of the intermediate layers 15A and 15B are preferably 0.5 μm or more, more preferably 1 μm or more, and still more preferably 1.3 μm or more. In order to suppress a decrease in the energy density of the battery, the upper limit of the average thickness of each of the intermediate layers 15A and 15B is preferably 300 μm or less, more preferably 200 μm or less, and still more preferably 150 μm or less.

In order to further suppress the decrease in charge-discharge efficiency and the increase in internal resistance, the ratios RA and RB are preferably 6% or more, more preferably 10% or more, and still more preferably 13% or more. In order to suppress the decrease in the energy density of the battery, the ratios RA and RB are preferably 200% or less, more preferably 150% or less, and still more preferably 100% or less.

The lithium ion conductivities of the intermediate layers 15A and 15B may be the same or different. The average thicknesses $TA_2$ and $TB_2$ may be the same or different. The ratios RA and RB may be the same or different.

Here, the average thickness $TA_2$ of the intermediate layer 15A is obtained as follows. First, a cross-section of the intermediate layer 15A is prepared by FIB (Focused Ion Beam) or the like, and a cross-sectional SEM (Scanning Electron Microscope) image is photographed. Next, ten points are randomly selected from the cross-sectional SEM image, a thickness of the intermediate layer 15A is measured at each of the points, and these measurement values are simply averaged (arithmetic mean), thereby determining the average thickness of the intermediate layer 15A.

The average thickness $TB_2$ of the intermediate layer 15B, the average thickness $TA_1$ of the positive electrode layer 21, and the average thickness $TB_1$ of the negative electrode layer 22 are obtained by the same procedure as the average thickness $TA_2$ of the intermediate layer 15A.

The lithium ion conductivities of the intermediate layers 15A and 15B can be obtained in the same manner as the method of measuring the lithium ion conductivity of the solid electrolyte layer 23 described above, except that the intermediate layers 15A and 15B are taken out from the battery by ion milling, polishing, or the like.

(Glass Transition Temperature of Each Layer, etc.)

The glass transition temperatures of the oxide glasses contained in the positive electrode current collector layer 21A, the positive electrode active material layer 21B, the negative electrode layer 22, and the solid electrolyte layer 23 are preferably the same or substantially the same temperature. In this case, since the oxide glass contained in each of these layers can be sintered at the same or substantially the same temperature, the oxide glass contained in each of these layers can be sintered simultaneously or almost simultaneously. Accordingly, a battery manufacturing process can be simplified.

It is preferable that the positive electrode current collector layer 21A, the positive electrode active material layer 21B, the negative electrode current collector layer 22A, and the negative electrode layer 22 contain substantially no organic binder from the viewpoint of improving the electric conductivity and lithium conductivity. Further, it is preferable that the solid electrolyte layer 23 contain substantially no organic binder from the viewpoint of improving the lithium conductivity.

It is preferable that the positive electrode current collector layer 21A, the positive electrode active material layer 21B, the negative electrode current collector layer 22A, and the negative electrode layer 22 do not substantially contain a carbide of an organic binder from the viewpoint of improving the electric conductivity and the lithium conductivity. Further, it is preferable that the solid electrolyte layer 23 contain substantially no carbide of an organic binder from the viewpoint of improving the lithium conductivity. The carbide of the organic binder may be generated, for example, when the organic binder is burned (degreased) in a process of manufacturing the battery.

[1.2 Operation of Battery]

In this battery, during charging, for example, lithium ions released from the positive electrode layer 21 are taken into the negative electrode layer 22 via the solid electrolyte layer 23. On the other h and, during discharging, for example, lithium ions released from the negative electrode layer 22 are taken into the positive electrode layer 21 via the solid electrolyte layer 23.

[1.3 Method of Manufacturing Battery]

Hereinafter, an example of a method of manufacturing a battery according to the first embodiment of the present invention will be described.

(Process of Producing Solid Electrolyte Layer-Producing Green Sheet)

First, a lithium-containing oxide glass as an oxide-based inorganic solid electrolyte and an organic binder are mixed to prepare a mixture powder, and then this mixture powder is dispersed in a solvent, thereby preparing a solid electrolyte layer-producing paste.

As the organic binder, for example, a polymer binder such as acrylic resin can be used. While the solvent is not particularly limited as long as it can disperse the mixture powder, the one that burns off in a temperature range lower than the glass transition temperature of the lithium-containing oxide glass contained in the solid electrolyte layer-producing pate is preferable. As the solvent, for example, lower alcohols having 4 or less carbon atoms such as methanol, ethanol, isopropanol, n-butanol, sec-butanol, and t-butanol, aliphatic glycols such as ethylene glycol, propylene glycol (1,3-propanediol), 1,3-propanediol, 1,4-butanediol, 1,2-butanediol, 1,3-butanediol, and 2-methyl-1,3-propanediol, ketones such as methyl ethyl ketone, amines such as dimethylethylamine, alicyclic alcohols such as terpineol, butyl acetate, and the like can be used alone or in a mixture of two or more, but it is not particularly limited thereto. Examples of the dispersion method include agitation treatment, ultrasonic dispersion treatment, bead dispersion treatment, kneading treatment, and homogenizer treatment. As the organic binder and the solvent used in a process of producing each paste described below, materials similar to those for the solid electrolyte layer-producing paste can be exemplified.

Next, an electrolyte paste is uniformly applied on a surface of a supporting substrate to form a paste layer. As the supporting substrate, for example, a polymer resin film such as a polyethylene terephthalate (PET) film or the like can be used. Here, the application is defined as including printing. As the application method, for example, a die coating method, a micro gravure coating method, a wire bar coating method, a direct gravure coating method, a reverse roll coating method, a comma coating method, a knife coating method, a spray coating method, a curtain coating method, a dipping method, a spin coating method, a relief printing method, an offset printing method, a gravure printing method, an intaglio printing method, a rubber plate printing method, a screen printing method, or the like can be used, but it is not particularly limited thereto.

In order to facilitate peeling of a solid electrolyte layer-producing green sheet from the surface of the supporting substrate in the post-process, it is preferable to apply peeling treatment to the surface of the supporting substrate beforehand. Examples of the peeling treatment include a method of applying or printing on the surface of the supporting substrate beforehand a composition that imparts the peeling property. Examples of the composition that imparts the peeling property include a paint containing a binder as a main component and to which wax, fluorine, or the like is added and a silicone resin.

Next, a paste layer is dried to form a solid electrolyte layer-producing green sheet as a solid electrolyte layer precursor on the supporting substrate. Examples of the drying method include air drying by natural drying, hot air, and the like, heat drying by infrared ray, far-infrared ray, and the like, and vacuum drying. These drying methods may be used alone or in combination of two or more.

(Process of Producing Positive Electrode Active Material Layer-Producing Green Sheet)

First, a positive electrode active material, a lithium-containing oxide glass as an oxide-based inorganic solid electrolyte, an organic binder, and, if necessary, a conductive auxiliary agent are mixed to prepare a mixture powder, and then this mixture powder is dispersed in a solvent, thereby preparing a positive electrode active material layer-producing paste.

Next, a positive electrode active material layer-producing green sheet as a positive electrode active material layer precursor is produced on the supporting substrate in the same manner as the above-described "Process of producing solid electrolyte layer-producing green sheet" except for using the positive electrode active material layer-producing paste.

(Process of Producing Negative Electrode Layer-Producing Green Sheet)

First, a negative electrode active material, a lithium-containing oxide glass as an oxide-based inorganic solid electrolyte, an organic binder, and, if necessary, a conductive auxiliary agent are mixed to prepare a mixture powder, and then this mixture powder is dispersed in a solvent, thereby preparing a negative electrode layer-producing paste.

Next, a negative electrode layer-producing green sheet as a negative electrode layer precursor is produced on the supporting substrate in the same manner as the above-described "Process of producing solid electrolyte layer-producing green sheet" except for using the negative electrode layer-producing paste.

(Process of Producing Positive Electrode Current Collector Layer-Producing Green Sheet)

First, a conductive particle powder, a lithium-containing oxide glass as an inorganic binder, and an organic binder are mixed to prepare a mixture powder, and then this mixture powder is dispersed in a solvent, thereby obtaining a positive electrode current collector layer-producing paste.

Next, a positive electrode current collector layer-producing green sheet as a positive electrode current collector layer precursor is produced on the supporting substrate in the same manner as the above-described "Process of producing solid electrolyte layer-producing green sheet" except for using the positive electrode current collector layer-producing paste.

(Process of Producing Exterior Material-Producing Green Sheet)

First, a ceramic powder, an organic binder, and, if necessary, a particle powder are mixed to prepare a mixture powder, and then this mixture powder is dispersed in a solvent, thereby preparing an exterior material-producing paste.

Next, an exterior material-producing green sheet as an exterior material precursor is produced on the supporting substrate in the same manner as the above-described "Process of producing solid electrolyte layer-producing green sheet" except for using the exterior material-producing paste.

(Process of Producing Intermediate Layer-Forming Green Sheet)

First, a lithium-containing oxide glass as an oxide-based inorganic solid electrolyte and an organic binder are mixed to prepare a mixture powder, and then this mixture powder is dispersed in a solvent, thereby preparing an intermediate layer-producing paste.

Next, an intermediate layer-producing green sheet as an intermediate layer precursor is produced on the supporting substrate in the same manner as the above-described "Process of producing solid electrolyte layer-producing green sheet" except for using the intermediate layer-producing paste.

(Process of Producing Conductive Paste)

A conductive particle powder, an organic binder, and, if necessary, oxide glass as an inorganic binder are mixed to prepare a mixture powder, and then this mixture powder is dispersed in a solvent, thereby preparing a conductive paste for producing a positive electrode terminal and a negative electrode terminal.

(Process of Producing Battery Element)

The exterior battery element 11 having the configuration shown in FIGS. 1A, 1B, and 2 is produced as follows. First, each green sheet obtained as described above is cut together with the supporting substrate. Consequently, one positive electrode active material layer-producing green sheet, one positive electrode current collector layer-producing green sheet, one negative electrode layer-producing green sheet, one solid electrolyte layer-producing green sheet, two exterior material-producing green sheets, and two intermediate layer-producing green sheets, which have a rectangular shape, one exterior material-producing green sheet having a square shape, and one exterior material-producing green sheet are obtained. Next, after each green sheet is peeled from the supporting substrate, a laminate as an exterior battery element precursor is formed by stacking each green sheet as a precursor so as to correspond to the configuration of the exterior battery element 11 shown in FIG. 2.

Next, each green sheet constituting a laminate is pressure-bonded. Examples of the pressure bonding method include Cold Isostatic Press (CIP), hot press method, and a warm isostatic press (WIP) method. Subsequently, the laminate is heated to burn (degrease) a binder contained in each green sheet constituting the laminate. Thereafter, the laminate is fired to heat and sinter oxide glass contained in each green sheet constituting the laminate. Consequently, the exterior battery element 11 is obtained.

It is preferable that the oxide glass contained in each green sheet constituting the laminate have the same or substantially the same glass transition temperature. In this case, since the oxide glass contained in each green sheet constituting the laminate can be sintered at the same or substantially the same temperature, the oxide glass contained in each green sheet constituting the laminate can be sintered simultaneously or almost simultaneously. Accordingly, a battery manufacturing process can be simplified.

(Process of Producing Terminal)

First, a conductive paste is dipped on each of the first and second end surfaces 11SA and 11SB of the exterior battery element 11. Thereafter, the exterior battery element 11 is fired to sinter the conductive particles contained in the conductive paste. Thus, a target battery is obtained.

[1.4 Effect]

The battery according to the first embodiment described above is provided between the first main surface of the battery element 20 and the exterior material 14A, and includes the intermediate layer 15A containing a solid electrolyte. (A1) The lithium ion conductivity of the intermediate layer 15A $1\times10^{-8}$ S/cm or more, (A2) the average thickness $TA_1$ of the intermediate layer 15A is 0.3 μm or more, and (A3) of the active material layers included in the battery element 20, the ratio RA ($=(TA_2/TA_1)\times100$) of the average thickness $TA_1$ of the positive electrode active material layer 21B closest to the intermediate layer 15A and the average thickness $TA_2$ of the intermediate layer 15A is 5% or more. Consequently, it is possible to suppress mixing of foreign matter into the positive electrode active material layer 21B from the exterior material 14A due to the diffusion phenomenon.

In addition, the battery according to the first embodiment is provided between the second main surface of the battery element 20 and the exterior material 14B, and includes the intermediate layer 15B containing a solid electrolyte. (B1) The lithium ion conductivity of the intermediate layer 15B is $1\times10^{-8}$ S/cm or more, (B2) the average thickness $TB_1$ of the intermediate layer 15B is 0.3 μm or more, and (B3) of the active material layers included in the battery element 20, the ratio RB ($=(TB_2/TB_1)\times100$) of the average thickness $TB_1$ of the negative electrode layer 22 closest to the intermediate layer 15A and the average thickness $TB_2$ of the intermediate layer 15A is 5% or more. Consequently, it is possible to suppress mixing of foreign matter into the negative electrode layer 22 from the exterior material 14B due to the diffusion phenomenon.

As described above, in the battery according to the first embodiment, since it is possible to suppress mixing of foreign matter into the positive electrode active material layer 21B from the exterior material 14A and prevent foreign matter from being mixed into the negative electrode layer 22 from the exterior material 14B, the decrease in charge-discharge efficiency and the increase in internal resistance can be suppressed.

In a general battery (for example, the battery described in Prior Art Document 1) including an exterior material, particularly in the sintering process when manufacturing the battery, the charge-discharge efficiency may decrease, and the internal resistance may increase. However, not only due to the sintering process but also due to the use environment and use period of the battery, the charge-discharge efficiency may decrease, and the internal resistance may increase.

2. Second Embodiment

[2.1 Battery Configuration]

Figure 3:
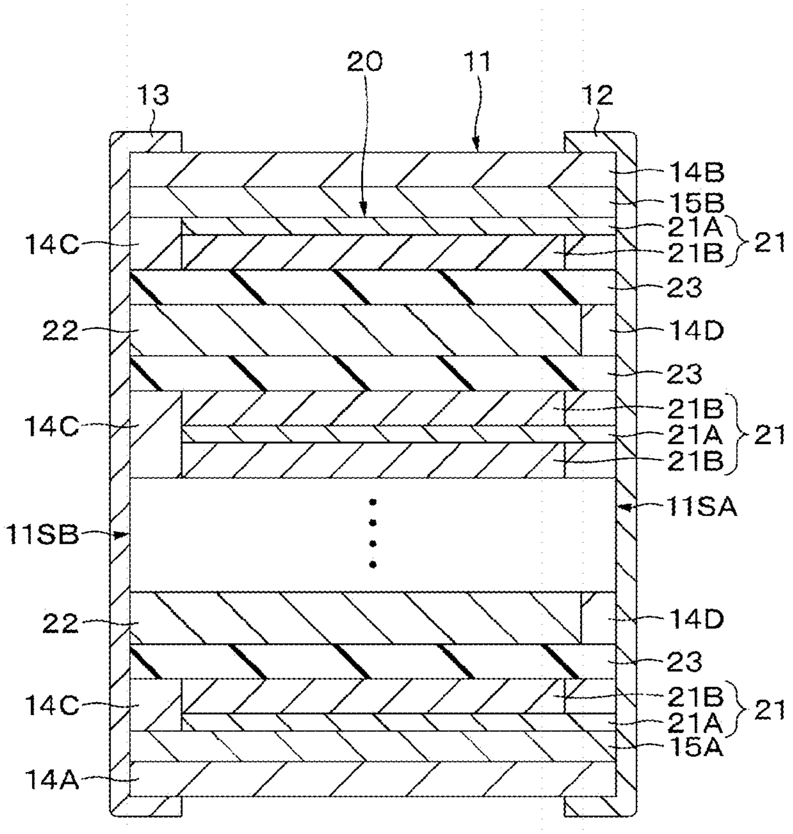
FIG. 3 is a sectional view showing an example of a battery configuration according to a second embodiment of the present invention.

A battery according to a second embodiment of the present invention, as shown in FIG. 3, has a configuration in which a rectangular plate-shaped battery element 20 includes a plurality of positive electrode layers 21, a plurality of negative electrode layers 22, and a plurality of solid electrolyte layers 23, and the positive electrode layer 21 and the negative electrode layer 22 are stacked so as to sandwich the solid electrolyte layer 23 in between.

The positive electrode layers 21 are provided at opposed ends of the battery element 20 in the stacking direction. The positive electrode layers 21 provided at opposed ends of the battery element 20 in the stacking direction include a positive electrode current collector layer 21A and a positive electrode active material layer 21B provided on one of both main surfaces of the positive electrode current collector layer 21A, which faces the negative electrode layer 22. That is, the positive electrode layers 21 provided at both the ends of the battery element 20 in the stacking direction have a configuration in which the positive electrode active material layer 21B is provided only on one main surface of the positive electrode current collector layer 21A. The positive electrode layer 21 provided at other than both the ends of the battery element 20 in the stacking direction includes the positive electrode current collector layer 21A and the positive electrode active material layers 21B provided on both the main surfaces of the positive electrode current collector layer 21A.

[2.2 Method of Manufacturing Battery]

The method of manufacturing a battery according to the second embodiment of the present invention is similar to the battery manufacturing method according to the first embodiment, except that each green sheet is stacked so as to correspond to the configuration of the exterior battery element 11 shown in FIG. 3 to form a laminate as an exterior battery element precursor.

[2.3 Effect]

Figure 4:
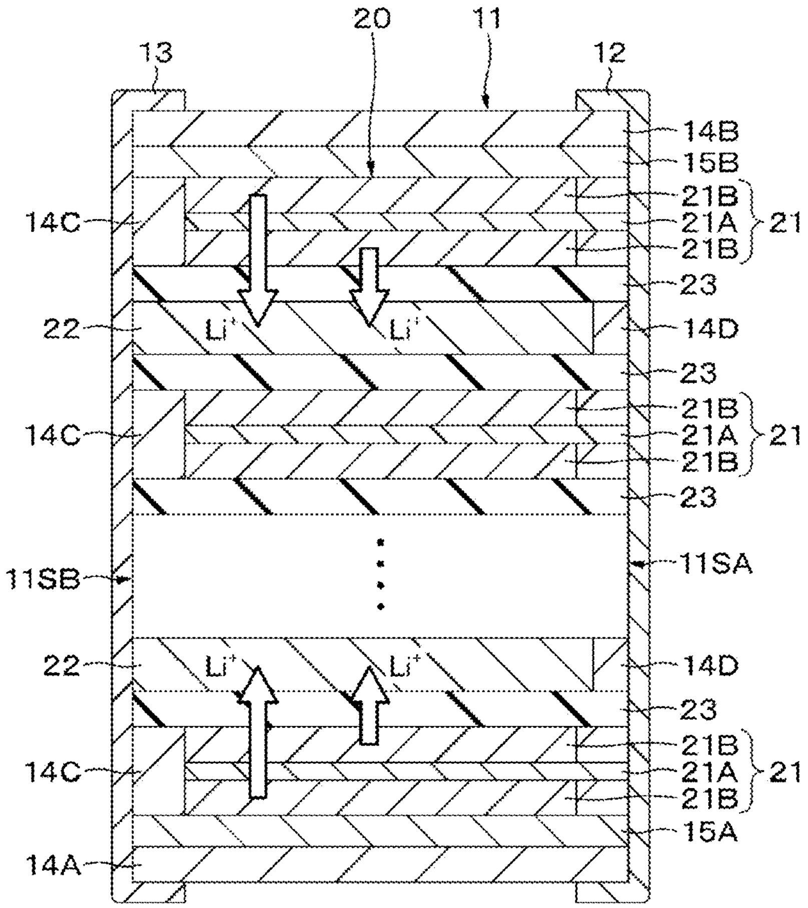
FIG. 4 is a sectional view showing a battery configuration according to Reference Example 1.

In order to facilitate understanding of the function and effect of the battery according to the second embodiment described above, first, a problem of the battery according to Reference Example 1 will be described. In the battery according to Reference Example 1, as shown in FIG. 4, the positive electrode layers 21 provided at both the ends of the battery element 20 in the stacking direction have a configuration in which the positive electrode active material layers 21B are provided on both the main surfaces of the positive electrode current collector layer 21A.

In the battery according to Reference Example 1 having the above configuration, during charging, the following reaction may occur between the positive electrode layers 21 provided at opposed ends of the battery element 20 in the stacking direction and the negative electrode layer 22 facing the positive electrode layer 21. That is, from the positive electrode active material layer 21B provided on one of both the main surfaces (that is, the main surface facing the intermediate layers 15A and 15B) of the positive electrode current collector layer 21A, which does not face the negative electrode layer 22, Li ions may be supplied to the negative electrode layer 22, and the Li ions may be deposited on the surface of the negative electrode layer 22. Accordingly, the initial capacity and the charge-discharge efficiency may decrease.

On the other h and, in the battery according to the second embodiment described above, as shown in FIG. 3, the positive electrode layers 21 provided at both the ends of the battery element 20 in the stacking direction have a configuration in which the positive electrode active material layer 21B is provided on only one of both the main surfaces of the positive electrode current collector layer 21A, which faces the negative electrode layer 22. Thus, it is possible to suppress deposition of the Li ions on the surface of the negative electrode layer 22. Accordingly, a decrease in the initial capacity and the charge-discharge efficiency can be suppressed.

In the positive electrodes layers 21 at both the ends of the battery element 20 in the stacking direction, the positive electrode active material layer 21B is provided on only one of both the main surfaces of the positive electrode current collector layer 21A, which faces the negative electrode layer 22, so that the positive electrode active material layer 21B unnecessary for battery reaction can be omitted. Accordingly, a volume energy density can be improved.

As described above, since the positive electrode active material layer 21B unnecessary for the battery reaction can be omitted, it is possible to reduce the number of times the paste is applied in the battery manufacturing process. Material cost required for each battery can be reduced.

3. THIRD EMBODIMENT

[3.1 Battery Configuration]

Figure 5:
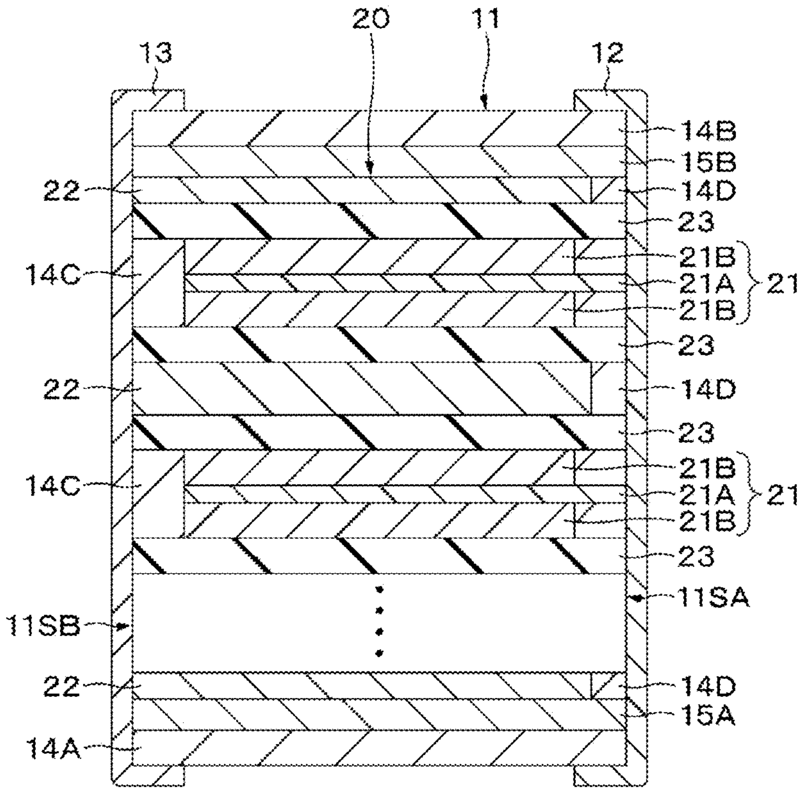
FIG. 5 is a sectional view showing an example of a battery configuration according to a third embodiment of the present invention.

The battery according to the third embodiment of the present invention is, as shown in FIG. 5, different from the battery according to the second embodiment in that negative electrode layers 22 are provided at opposed ends of a battery element 20 in the stacking direction. An average thickness $ta_1$ of the negative electrode layer 22 provided at other than opposed ends of the battery element 20 in the stacking direction and an average thickness $ta_2$ of the negative electrode layers 22 provided at both the ends of the battery element 20 in the stacking direction satisfy a relationship of $ta_1 \times (1/3) \leq ta_{29} \leq ta_1 \times (2/3)$, preferably about $ta_1 \times (1/2)$.

When $ta_2$ is $ta_2 < ta_1 \times (1/3)$, since the negative electrode layers 22 provided at both the ends of the battery element 20 in the stacking direction are too thin, Li ions are deposited on surfaces of these negative electrode layers 22 during charging, it may not be possible to suppress the decrease in the initial capacity and the charge-discharge efficiency. On the other h and, if $ta_2$ is $ta_1 \times (2/3) < ta_2$, the negative electrode layers 22 provided at both the ends of the battery element 20 in the stacking direction are too thick, and, during charging, Li ions very deeply enter the negative electrode layers 22 provided at both the ends of the battery element 20 in the stacking direction, when viewed from the positive electrode layer 21 facing each of the negative electrode layers 22. Li ions that have entered very deeply may not be able to escape from these negative electrode layers 22 during discharging, and irreversible loss of Li ions may occur. Accordingly, it may not be possible to suppress the decrease in the initial capacity and the charge-discharge efficiency.

The average thickness $ta_1$ of the negative electrode layer 22 provided at other than both the ends of the battery element 20 in the stacking direction and the average thickness $ta_2$ of the negative electrode layers 22 provided at both the ends of the battery element 20 in the stacking direction are obtained by the same procedure as the average thickness $TA_2$ of the intermediate layer 15A in the first embodiment described above.

[3.2 Method of Manufacturing Battery]

A method of manufacturing a battery according to a third embodiment of the present invention is different from the battery manufacturing method according to the second embodiment in that the following processes are performed.

(Process of Producing First Negative Electrode Layer-Producing Green Sheet)

A first negative electrode layer-producing green sheet is produced as follows. The first negative electrode layer-producing green sheet is a first negative electrode layer precursor for forming the negative electrode layer 22 provided at other than both the ends of the battery element 20 in the stacking direction. First, a negative electrode layer-producing paste is uniformly applied 2n times to a surface of a supporting substrate to laminate 2n paste layers (coating layers). The paste layer may be dried each time the negative electrode layer-producing paste is applied once, or may be dried after applying 2n times. Here, n is an integer of 1 or more. 2n means 2×n.

(Process of Producing Second Negative Electrode Layer-Producing Green Sheet)

A second negative electrode layer-producing green sheet is produced as follows. The second negative electrode layer-producing green sheet is a second negative electrode layer precursor for forming the negative electrode layers 22 provided at both the ends of the battery element 20 in the stacking direction. First, the negative electrode layer-producing paste is uniformly applied n times to the surface of the supporting substrate to laminate n paste layers (coating layers). When n is an integer of 2 or more, the paste layer may be dried each time the negative electrode layer-producing paste is applied once, or may be dried after applying n times. A thickness of the paste layer per layer in the process of producing the first negative electrode layer-producing green sheet is preferably the same or substantially the same as a thickness of the paste layer per layer in the process of producing the second negative electrode layer-producing green sheet.

(Process of Producing Battery Element)

A laminate as a battery element precursor is produced in the same manner as the process of producing the battery element in the second embodiment, except that first electrode layer-producing green sheets are arranged at other than opposed ends of the laminate and second electrode layer-producing green sheets are arranged at both the ends of the laminate.

[3.3 Effect]

Figure 6:
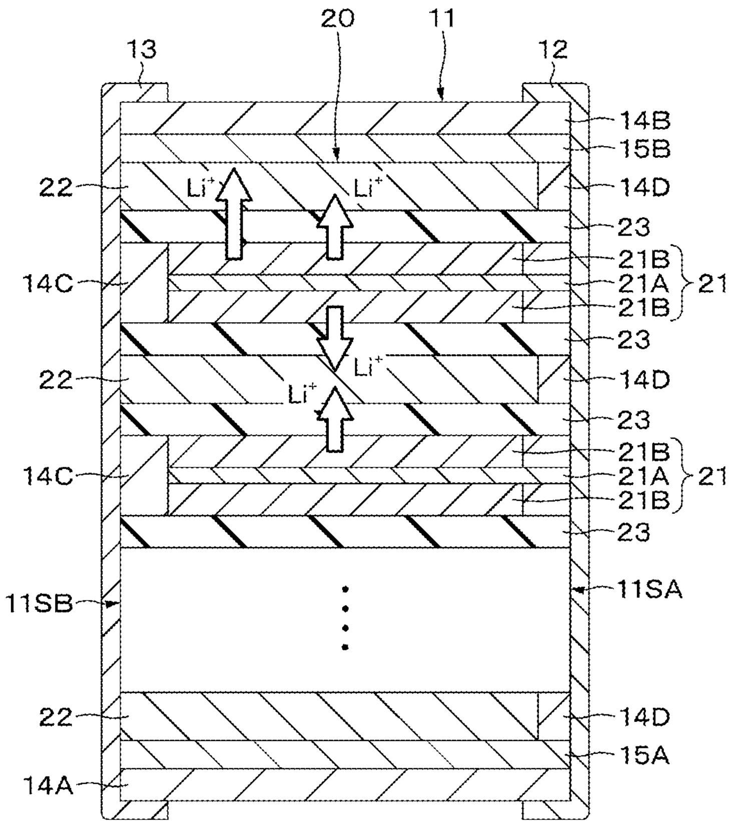
FIG. 6 is a sectional view showing a battery configuration according to Reference Example 2.

In order to facilitate understanding of the function and effect of the battery according to the third embodiment described above, first, a problem of the battery according to Reference Example 2 will be described. In the battery according to Reference Example 2, as shown in FIG. 6, the negative electrode layers 22 provided at both the ends of the battery element 20 in the stacking direction have a similar thickness to the negative electrode layers 22 provided at other than both the ends of the battery element 20 in the stacking direction.

In the battery according to Reference Example 2 having the above configuration, the negative electrode layers 22 provided at both the ends of the battery element 20 in the stacking direction have a thickness on the assumption that Li ions are supplied from both main surfaces. Thus, during charging, Li ions very deeply enter the negative electrode layers 22 provided at both the ends of the battery element 20 in the stacking direction, when viewed from the positive electrode layer 21 facing each of the negative electrode layers 22. As described above, the Li ions that have entered very deeply may not be able to escape from these negative electrode layers 22, 22 during discharging, and irreversible loss of Li ions may occur. Accordingly, it may not be possible to suppress the decrease in the initial capacity and the charge-discharge efficiency.

On the other h and, in the battery according to the third embodiment described above, an average thickness $t_1$ of the negative electrode layer 22 provided at other than both the ends of the battery element 20 in the stacking direction and an average thickness $t_2$ of the negative electrode layers 22 provided at both the ends of the battery element 20 in the stacking direction satisfy a relationship of $ta_1 \times (1/3) \leq ta_2 \leq ta_1 \times (2/3)$. Thus, in the battery according to the third embodiment, the negative electrode layers 22 provided at both the ends of the battery element 20 in the stacking direction have a thickness on the assumption that Li ions are supplied from one side. Thus, it is possible to prevent the Li ions from not escaping from the negative electrode layers 22, 22 during discharging. Accordingly, a decrease in the initial capacity and the charge-discharge efficiency can be suppressed.

While the negative electrode layer 22 provided at other than both the ends of the battery element 20 in the stacking direction is produced by applying a negative electrode layer-producing coating material 2n times, the negative electrode layers 22 provided at both the ends of the battery element 20 in the stacking direction are produced by applying the negative electrode layer-producing coating material n times. Accordingly, only by changing the number of times the negative electrode layer-producing coating material is applied, the negative electrode layer 22 provided at other than both the ends of the battery element 20 in the stacking direction and the negative electrode layers 22 provided at both the ends of the battery element 20 in the stacking direction can be produced separately. Specifically, the thickness of the latter can be half the thickness of the former.

Since the average thickness $t_1$ of the negative electrode layer 22 provided at other than both the ends of the battery element 20 in the stacking direction and the average thickness $t_2$ of the negative electrode layers 22 provided at both the ends of the battery element 20 in the stacking direction satisfy the relationship of $ta_1 \times (1/3)\ ta_2 \leq ta_1 \times (2/3)$, it is possible to prevent the negative electrode layers 22 provided at both the ends of the battery element 20 in the stacking direction from becoming unnecessarily thick. Accordingly, a volume energy density can be improved.

Since the negative electrode layers 22 provided at both the ends of the battery element 20 in the stacking direction are produced by applying the negative electrode layer-producing coating material n times, it is possible to reduce the number of times a paste is applied in the battery manufacturing process. Material cost required for each battery can be reduced.

4. MODIFICATION EXAMPLE

The first to third embodiments of the present invention have been specifically described above; however, the present invention is not limited to the above-described first to third embodiments. Various modifications of the present invention can be made based on the technical spirit of the present invention.

For example, the configurations, the methods, the processes, the shapes, the materials, the numerical values, and the like mentioned in the above-described first to third embodiments are merely examples. Different configurations, methods, processes, shapes, materials, numerical values, and the like may be used as necessary. Further, the chemical formulas of compounds and the like are representative and are not limited to the described valences and the like as long as common names of the same compounds are used.

The configuration, the methods, the processes, the shapes, the materials, the numerical values and the like in the above-described first to third embodiments may be combined insofar as they are not departing from the spirit of the present invention.

In the above-described first to third embodiments, the case where the battery is an all-solid-state lithium ion secondary battery or an all-solid-state lithium metal secondary battery has been described. However, the type of battery is not limited thereto, and, for example, the technical idea of the present invention can be applied to a battery containing lithium in a positive electrode or a negative electrode, such as an all-solid-state lithium-sulfur battery (a battery having a lithium negative electrode and a sulfur positive electrode). Alternatively, the technical idea of the present invention can be applied to an all-solid-state sodium ion secondary battery, an all-solid-state potassium ion secondary battery, an all-solid-state magnesium ion secondary battery, an all-solid-state calcium ion secondary battery, or the like. In that case, the positive electrode active material layer, the negative electrode active material layer, and the solid electrolyte layer will each contain oxide glass containing Na, K, Mg, Ca, etc., instead of Li. The battery is not limited to the secondary battery and may be a primary battery. The structure of the battery element 20 is not particularly limited and may have a bipolar type laminated structure.

In the above-described first to third embodiments, the case where the battery has a rectangular plate shape has been described, but the shape of the battery is not limited to the rectangular plate shape, and may be a circular plate shape, an elliptical plate shape, a polygonal plate shape other than the rectangular plate shape, an irregular plate shape, or the like. Further, the shape of the battery may be a curved plate shape such as a sheet shape or an arch shape, a bent shape, a columnar shape such as a circular columnar shape, or a block shape.

In the above-described first to third embodiments, the case where the battery has rigidity has been described, but the battery may be a flexible battery.

In the above-described first to third embodiments, the case where the positive electrode layer 21, the negative electrode layer 22, and the solid electrolyte layer 23 have a flat plate shape has been described, but the shapes of these layers are not limited to the flat plate shape, and may be a curved surface shape such as an arch shape, a tubular shape such as a cylindrical shape, or a spiral shape.

In the above-described first to third embodiments, the case where the oxide-based inorganic solid electrolyte contained in the positive electrode active material layer 21B, the negative electrode layer 22, the solid electrolyte layer 23, and the intermediate layers 15A and 15B contains the oxide glass has been described, but the oxide-based inorganic solid electrolyte contained in at least one of these layers may further contain oxide crystals from the viewpoint of improving the lithium ion conductivity. The oxide crystal may be the above oxide glass crystallized, or may be a known oxide crystal used as a solid electrolyte.

In the above-described first to third embodiments, the case where the positive electrode active material layer 21B, the negative electrode layer 22, the solid electrolyte layer 23, and the intermediate layers 15A and 15B contain the oxide-based inorganic solid electrolyte has been described, at least one of these layers may contain a sulfide-based inorganic solid electrolyte instead of the oxide-based inorganic solid electrolyte, or may further include a sulfide-based inorganic solid electrolyte in addition to the oxide-based inorganic solid electrolyte. In this case, the sulfide-based inorganic solid electrolyte contains at least one of sulfide glass and sulfide crystals, and preferably contains sulfide crystals from the viewpoint of improving the lithium ion conductivity. Known materials can be used as the sulfide glass and the sulfide crystals.

In the above-described first to third embodiments, the case where the positive electrode current collector layer 21A contains the lithium-containing oxide glass as the inorganic binder has been described, but the inorganic binder is not limited to this example, and glass other than the lithium-containing oxide glass may be used.

In the above-described first to third embodiments, the case where the exterior materials 14A to 14D include oxide as ceramics has been described, but ceramics other than the oxide may be included. The exterior materials 14A to 14D may contain a polymer resin instead of ceramics, or may contain the polymer resin together with the ceramics.

Figure 7:
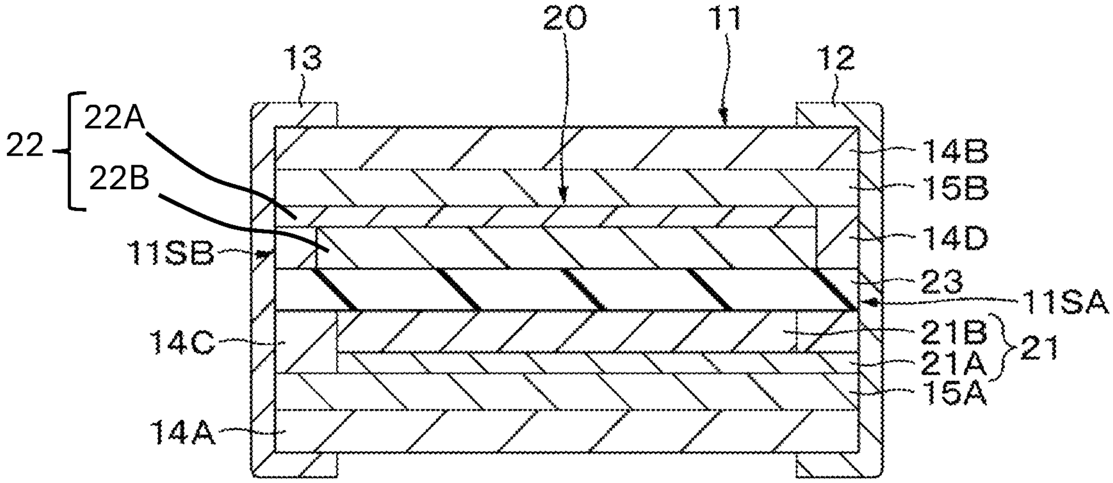
FIG. 7 is a sectional view showing an example of a battery configuration according to Modification Example.

In the above-described first and second embodiments, the case where the negative electrode layer 22 is composed of the negative electrode active material layer which also serves as the negative electrode current collector layer has been described, but, as shown in FIG. 7, the negative electrode layer 22 may include the negative electrode current collector layer 22A and the negative electrode active material layers 22B provided on both main surfaces of the negative electrode current collector layer 22A. In this case, as the negative electrode current collector layer 22A and the negative electrode active material layer 22B, for example, those having the following configurations can be used.

The negative electrode current collector layer 22A has the same configuration as the positive electrode current collector layer 21A.

The negative electrode active material layer 22B contains a negative electrode active material and a solid electrolyte. The solid electrolyte may have a function as a binder. The negative electrode active material layer 22B may further contain a conductive auxiliary agent, if necessary.

The negative electrode active material contains, for example, a negative electrode material capable of occluding and releasing a lithium ion, which is an electrode reactant. From the viewpoint of obtaining a high energy density, the negative electrode material preferably contains at least one of a carbon material and a metal-based material, but it is not particularly limited thereto.

The carbon material is, for example, easily graphitizable carbon, non-graphitizable carbon, graphite, mesocarbon microbeads (MCMB), highly oriented graphite (HOPG), or the like.

The metal-based material contains, for example, as a constituent element, a metal element or a semimetal element capable of forming an alloy with lithium. More specifically, for example, the metal-based material includes one or two or more types of a simple substance, an alloy, or a compound of Si, Sn, Al, In, Mg, B, Ga, Ge, Pb, Bi, Cd, Ag, Zn, Hf, Zr, Y, Pd, Pt, or the like. However, the simple substance is not limited to be 100% in purity, and it may contain trace impurities. Examples of the alloy or the compound include $SiB_4$, $TiSi_2$, SiC, $Si_3N_4$, SiOv ($0<v\leq 2$), LiSiO, $SnO_w$ ($0<w\leq 2$), $SnSiO_3$, LiSnO, and $Mg_2Sn$.

The metal-based material may be a lithium-containing compound or a lithium metal (a simple substance of lithium). The lithium-containing compound is a composite oxide (lithium transition metal composite oxide) containing lithium and a transition metal element as constituent elements. Examples of this composite oxide include $Li_4Ti_5O_{12}$.

The solid electrolyte contains lithium-containing oxide glass as the oxide-based inorganic solid electrolyte. The lithium-containing oxide glass is preferably the same as the lithium-containing oxide glass contained in the solid electrolyte layer 23. However, the components or compositions of the lithium-containing oxide glass contained in the negative electrode active material layer 22B and the solid electrolyte layer 23 may be the same or different.

As the conductive auxiliary agent, those similar to the conductive auxiliary agent contained in the positive electrode active material layer 21B described above can be exemplified.

In the above-described first to third embodiments, the case where the positive electrode layer 21 includes the positive electrode current collector layer 21A and the positive electrode active material layer 21B provided on one or both of the main surfaces of the positive electrode current collector layer 21A has been described, but the positive electrode layer 21 may have a configuration without a current collector layer and specifically may be composed of the positive electrode active material layer 21B which also serves as the positive electrode current collector layer 21A.

In the above-described first to third embodiments, the case where the battery includes the positive electrode terminal 12 and the negative electrode terminal 13 has been described, but the positive electrode terminal 12 and the negative electrode terminal 13 may not be included.

In the above-described second and third embodiments, the case where the battery includes the exterior materials 14A to 14D has been described, but the exterior materials 14A to 14D may not be included.

In the above-described first to third embodiments, the case where the battery includes both the intermediate layer 15A and the intermediate layer 15B has been described, but the battery may include any one of the intermediate layer 15A and the intermediate layer 15B. Also in this case, it is possible to obtain the effect of suppressing the decrease in charge-discharge efficiency and the increase in internal resistance. However, in order to obtain a better effect, the battery preferably includes both the intermediate layer 15A and the intermediate layer 15B.

In the above-described first embodiment, the intermediate layer 15A and, of the active material layers included in the battery element 20, the positive electrode active material layer 21B closest to the intermediate layer 15A may satisfy the following characteristics (C1), (C2), and (C3). Also in this case, it is possible to suppress mixing of foreign matter into the positive electrode active material layer 21B from the exterior material 14A due to the diffusion phenomenon, so that it is possible to suppress the decrease in charge-discharge efficiency and the increase in internal resistance.

(C1) The intermediate layer 15A has an ion conductivity of $1\times10^{-8}$ S/cm or more.

(C2) The average thickness $TA_2$ of the intermediate layer 15A is 0.5 μm or more.

(C3) Of the active material layers included in the battery element 20, a ratio RA ($=(TA_2/TA_1)\times100$) of an average thickness $TA_1$ of the positive electrode active material layer 21B closest to the intermediate layer 15A and an average thickness $TA_2$ of the intermediate layer 15A is 2.5% or more.

The intermediate layer 15B and, of the active material layers included in the battery element 20, the negative electrode layer 22 which is a negative electrode active material layer closest to the intermediate layer 15B may satisfy the following characteristics (D1), (D2), and (D3). Also in this case, it is possible to suppress mixing of foreign matter into the negative electrode layer 22 from the exterior material 14B due to the diffusion phenomenon, so that it is possible to suppress the decrease in charge-discharge efficiency and the increase in internal resistance.

(D1) The intermediate layer 15B has an ion conductivity of $1\times10^{-8}$ S/cm or more.

(D2) The intermediate layer 15B has an average thickness $TB_2$ of 0.5 μm or more.

(D3) Of the active material layers included in the battery element 20, a ratio RB ($=(TB_2/TB_1)\times100$) of an average thickness $TB_1$ of the negative electrode layer 22, which is the negative electrode active material layer closest to the intermediate layer 15B, and an average thickness $TB_2$ of the intermediate layer 15B is 2.5% or more.

However, in the battery satisfying the above characteristics, in order to further suppress the decrease in charge-discharge efficiency and the increase in internal resistance, the lithium ion conductivities of the intermediate layers 15A and 15B are preferably $1\times10^{-7}$ S/cm or more. In order to further suppress the decrease in charge-discharge efficiency and the increase in internal resistance, the average thickness of each of the intermediate layers 15A and 15B is preferably 1 μm or more, and more preferably 1.3 μm or more. In order to further suppress the decrease in charge-discharge efficiency and the increase in internal resistance, the ratios RA and RB are preferably 6% or more, and more preferably 13% or more.

In the above-described first embodiment, the intermediate layer 15A and, of the active material layers included in the battery element 20, the positive electrode active material layer 21B closest to the intermediate layer 15A may satisfy the following characteristics (E1) and (E2). Also in this case, it is possible to suppress mixing of foreign matter into the positive electrode active material layer 21B from the exterior material 14A due to the diffusion phenomenon, so that it is possible to suppress the decrease in charge-discharge efficiency and the increase in internal resistance.

(E1) The lithium ion conductivity of the intermediate layer 15A is $1\times10^{-8}$ S/cm or more.

(E2) Of the active material layers included in the battery element 20, the ratio RA ($=(TA_2/TA_1)\times100$) of the average thickness $TA_1$ of the positive electrode active material layer 21B closest to the intermediate layer 15A and the average thickness $TA_2$ of the intermediate layer 15A is 5% or more, or the average thickness $TA_2$ of the intermediate layer 15A is 0.5 μm or more.

The intermediate layer 15B and, of the active material layers included in the battery element 20, the negative electrode layer 22 which is a negative electrode active material layer closest to the intermediate layer 15B may satisfy the following characteristics (F1) and (F2). Also in this case, it is possible to suppress mixing of foreign matter into the negative electrode layer 22 from the exterior material 14B due to the diffusion phenomenon, so that it is possible to suppress the decrease in charge-discharge efficiency and the increase in internal resistance.

(F1) The lithium ion conductivity of the intermediate layer 15B is $1\times10^{-8}$ S/cm or more.

(F2) Of the active material layers included in the battery element 20, the ratio RB ($=(TB_2/TB_1)\times100$) of the average thickness $TB_1$ of the negative electrode layer 22, which is the negative electrode active material layer closest to the intermediate layer 15B, and the average thickness $TB_2$ of the intermediate layer 15B is 5% or more, or the average thickness $TB_2$ of the intermediate layer 15B is 0.5 μm or more.

However, in the battery satisfying the above characteristics, in order to further suppress the decrease in charge-discharge efficiency and the increase in internal resistance, the lithium ion conductivities of the intermediate layers 15A and 15B are preferably $1\times10^{-7}$ S/cm or more. In order to further suppress the decrease in charge-discharge efficiency and the increase in internal resistance, the ratios RA and RB are preferably 6% or more, and more preferably 13% or more. In order to further suppress the decrease in charge-discharge efficiency and the increase in internal resistance, the average thickness of each of the intermediate layers 15A and 15B is preferably 1 μm or more, and more preferably 1.3 μm or more.

Figure 8:
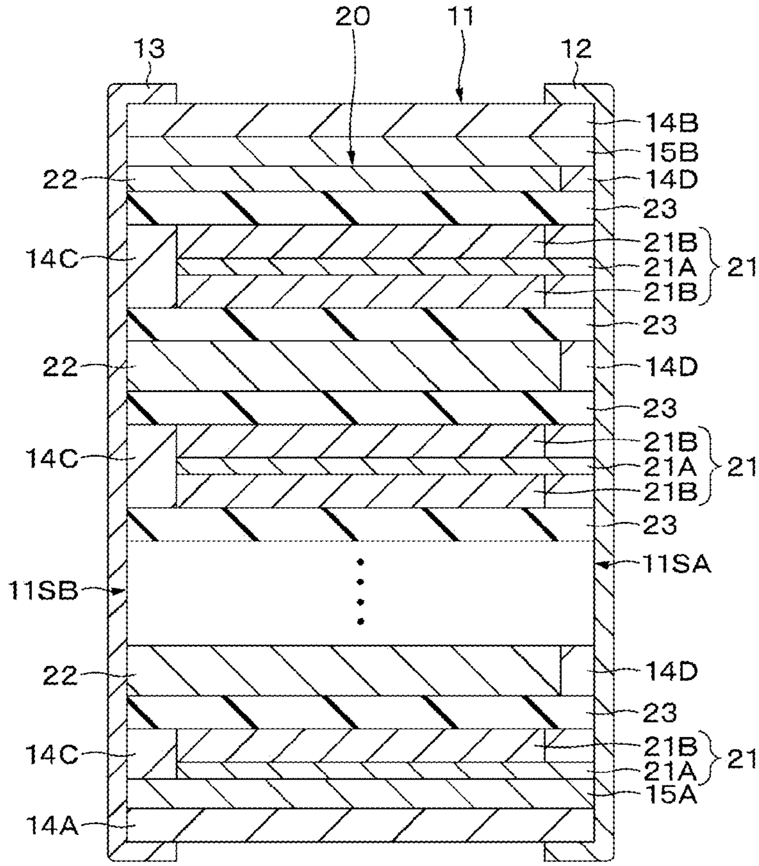
FIG. 8 is a sectional view showing an example of a battery configuration according to Modification Example.

In the above-described third embodiment, the case where the negative electrode layers 22 are provided at both the ends of the battery element 20 in the stacking direction has been described, but, as shown in FIG. 8, the positive electrode layer 21 may be provided at one end of the battery element 20 in the stacking direction, and the negative electrode layer 22 may be provided at the other end. In this case, the positive electrode layer 21 provided at one end has the same configuration as the positive electrode layer 21 provided at one end of the battery element 20 in the stacking direction in the second embodiment.

In the above-described second embodiment, the case where the positive electrode layers 21 are provided at both the ends of the battery element 20 in the stacking direction has been described, but the negative electrode layers 22 may be provided at both the ends of the battery element 20 in the stacking direction. In this case, the negative electrode layers 22 provided at both the ends of the battery element 20 in the stacking direction include the negative electrode current collector layer 22A and the negative electrode active material layer 22B provided on one of both the main surfaces of the negative electrode current collector layer 22A, which faces the positive electrode layer 21. That is, the negative electrode layers 22 provided at both the ends of the battery element 20 in the stacking direction have a configuration in which the negative electrode active material layer 22B is provided only on one main surface of the negative electrode current collector layer 22A. On the other h and, the negative electrode layer 22 provided at other than both the ends of the battery element 20 in the stacking direction includes the negative electrode current collector layer 22A and the negative electrode active material layers 22B provided on both the main surfaces of the negative electrode current collector layer 22A.

In the above-described third embodiment, the case where the negative electrode layers 22 are provided at both the ends of the battery element 20 in the stacking direction has been described, but the positive electrode layers 21 may be provided at both the ends of the battery element 20 in the stacking direction. In this case, the positive electrode layer 21 has a configuration without a current collector layer, and is specifically composed of a positive electrode active material layer 21B which also serves as the positive electrode current collector layer 21A. An average thickness $tb_1$ of the positive electrode layer 21 provided at other than both the ends of the battery element 20 in the stacking direction and an average thickness $tb_2$ of the positive electrode layers 21 provided at both the ends of the battery element 20 in the stacking direction satisfy a relationship of $tb_1 \times (1/3) \leq tb_2 \leq tb_1 \times (2/3)$, preferably about $tb_1 \times (1/2)$.

When $tb_2$ is $tb_2 < tb_1 \times (1/3)$, the positive electrode layers 21 provided at both the ends of the battery element 20 in the stacking direction are too thin, so that Li ions are extracted too much from the positive electrode active material during charging, and the positive electrode active material may cause structural collapse. Accordingly, it may not be possible to suppress the decrease in the initial capacity and the charge-discharge efficiency. On the other h and, when $tb_2$ is $tb_1 \times (2/3) < tb_2$, the positive electrode layers 21 provided at both the ends of the battery element 20 in the stacking direction are too thick, and therefore, the energy density is reduced.

In the above-described first to third embodiments, the case where all the layers of the battery element 20 are made of green sheets has been described, but the battery manufacturing method is not limited thereto. For example, a predetermined layer may be a green sheet, and other layers may be directly formed on the green sheet by printing or the like.

For example, the precursor of the negative electrode layers 22 provided at both the ends of the battery element 20 in the stacking direction and at other than both the ends may be produced by applying a paste for forming a negative electrode layer onto a green sheet for forming a solid electrolyte layer. More specifically, the precursor of the negative electrode layer 22 provided at other than both the ends of the battery element 20 in the stacking direction may be produced by applying the paste for forming a negative electrode layer 2n times on the green sheet for forming a solid electrolyte layer and stacking 2n coating layers. On the other h and, the precursor of the negative electrode layers 22 provided at both the ends of the battery element 20 in the stacking direction may be produced by applying the paste for forming a negative electrode layer n times on the green sheet for forming a solid electrolyte layer and stacking n coating layers.

5. EXAMPLE

Hereinafter, the present invention will be described specifically with examples, but the present invention is not limited only to the examples.

In Examples 1 to 7 and Comparative Examples 1 and 2 below, the ion conductivities of the intermediate layers 15A and 15B, the average thickness $T_1$ of the active material layers each closest to the intermediate layer 15A or 15B, among the active material layers included in the battery element 20, and the average thickness $T_2$ of each of the intermediate layers 15A and 15B are values obtained by the measuring method described in the above-described first embodiment.

In Examples 7 and 8 below, the average thickness $ta_1$ of the negative electrode layer 22 provided at other than both the ends of the battery element 20 and the average thickness $ta_2$ of the negative electrode layers 22 provided at both the ends of the battery element 20 are values obtained by the measuring method described in the above-described third embodiment.

In Examples and Comparative Examples below, the lithium-containing oxide glasses (A), (B) and (C) mean those having the following compositions.

Lithium-containing oxide glass (A): $Li_2O:SiO_2:B_2O_3$=60:10:30 (mol % ratio)

Lithium-containing oxide glass (B): $Li_2O:SiO_2:B_2O_3$=54:11:35 (mol % ratio)

Lithium-containing oxide glass (C): $Li_2O:SiO_2:B_2O_3$=70:17:13 (mol % ratio)

5.1 Example and Comparative Example Studying Intermediate Layer

Example 1

Figure 9:
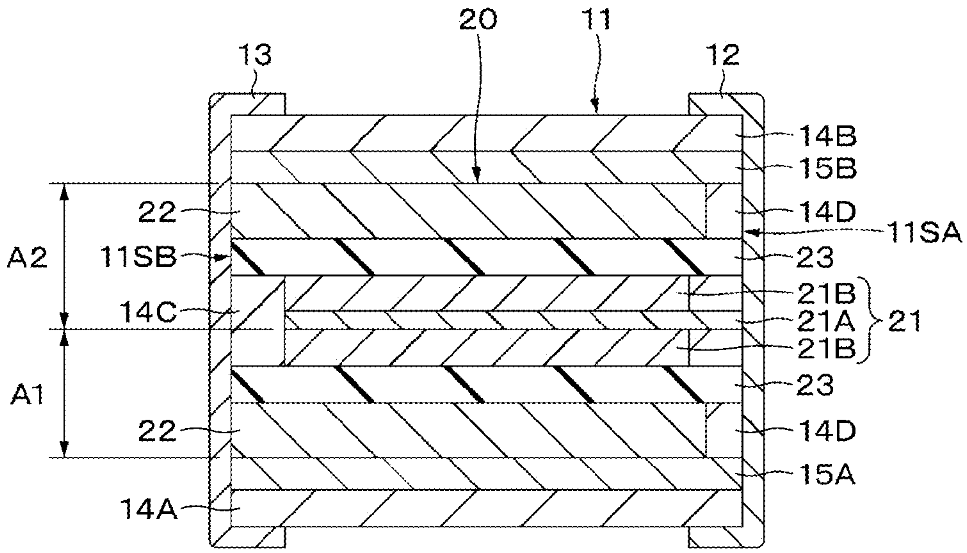
FIG. 9 is a sectional view showing a battery configuration according to Example 1.

In Example 1, a battery having the configuration shown in FIG. 9 was manufactured as follows.

(Process of Producing Solid Electrolyte Layer-Producing Green Sheet)

First, the lithium-containing oxide glass (A) as a solid electrolyte and an acrylic binder were mixed in a mass ratio of lithium-containing oxide glass:acrylic binder=70:30. Next, the resulting mixture was mixed with butyl acetate so that the solid content was 30% by mass, and then this mixture was stirred with 5 mmφ zirconia balls for 4 hours to obtain a solid electrolyte layer-producing paste. Subsequently, this paste was applied onto a release film and dried at 80° C. for 10 minutes to produce a solid electrolyte layer-producing green sheet as a solid electrolyte layer precursor. Next, this green sheet was cut into a rectangular shape together with the release film and then peeled from the release film. Consequently, a solid electrolyte layer-producing green sheet having a rectangular shape was obtained.

(Process of Producing Positive Electrode Active Material Layer-Producing Paste)

First, lithium cobalt oxide ($LiCoO_2$) as a positive electrode active material and the lithium-containing oxide glass (A) as a solid electrolyte (and an inorganic binder) were mixed in a mass ratio of lithium cobalt oxide:lithium-containing oxide glass (A)=70:30. Next, the resulting mixture and an acrylic binder were mixed in a mass ratio of mixture (lithium cobalt oxide+lithium-containing oxide glass (A)):acrylic binder=70:30, and then this mixture was mixed with butyl acetate so that the solid content was 30% by mass. Then, the resulting mixture was stirred with 5 mmφ zirconia balls for 4 hours to obtain a positive electrode active material layer-producing paste.

(Process of Producing Negative Electrode Layer-Producing Paste)

First, a carbon powder as a negative electrode active material and the lithium-containing oxide glass (A) as a solid electrolyte (and an inorganic binder) were mixed in a mass ratio of carbon powder:lithium-containing oxide glass (A)=70:30. Next, the resulting mixture and an acrylic binder were mixed in a mass ratio of mixture (carbon powder+lithium-containing oxide glass (A)):acrylic binder=70:30, and then this mixture was mixed with butyl acetate so that the solid content was 30% by mass. Then, the resulting mixture was stirred with 5 mmφ zirconia balls for 4 hours to obtain a negative electrode layer-producing paste.

(Process of Producing Positive Electrode Current Collector Layer-Producing Paste)

First, a carbon powder as a conductive material and the lithium-containing oxide glass (A) as a solid electrolyte (and an inorganic binder) were mixed in a mass ratio of carbon powder:lithium-containing oxide glass (A)=70:30. Next, the resulting mixture and an acrylic binder were mixed in a mass ratio of mixture (carbon powder+lithium-containing oxide glass (A)):acrylic binder=70:30, and then this mixture was mixed with butyl acetate so that the solid content was 30% by mass. Then, the resulting mixture was stirred with 5 mmφ zirconia balls for 4 hours to obtain a positive electrode current collector layer-producing paste.

(Process of Producing Exterior Material-Producing Paste)

First, the lithium-containing oxide glass (B) and an alumina particle powder as a particle powder were mixed in a mass ratio of lithium-containing oxide glass (B):alumina particle powder=50:50. Next, the resulting mixture and an acrylic binder were mixed in a mass ratio of mixture (lithium-containing oxide glass (B)+alumina particle powder):acrylic binder=70:30, and then this mixture was mixed with butyl acetate so that the solid content was 30% by mass. Then, the resulting mixture was stirred with 5 mmφ zirconia balls for 4 hours to obtain an exterior material-producing paste.

(Process of Producing Exterior Material-Producing Green Sheet)

First, an exterior material-producing paste was obtained in the same manner as in the "Process of producing exterior material-producing paste". Subsequently, this paste was applied onto a release film and dried at 80° C. for 10 minutes to produce an exterior material-producing green sheet as an exterior material precursor. Next, this green sheet was cut into a rectangular shape together with the release film and then peeled from the release film. Consequently, a rectangular exterior material forming-green sheet was obtained.

(Process of Producing Intermediate Layer-Producing Green Sheet)

First, the lithium-containing oxide glass (A) as a solid electrolyte and an acrylic binder were mixed in a mass ratio of lithium-containing oxide glass (A):acrylic binder=70:30. Next, the resulting mixture was mixed with butyl acetate so that the solid content was 30% by mass, and then this mixture was stirred with 5 mmφ zirconia balls for 4 hours to obtain an intermediate layer-producing paste. Subsequently, this paste was applied onto a release film and dried at 80° C. for 10 minutes to produce an intermediate layer-producing green sheet as an intermediate layer precursor. Next, this green sheet was cut into a rectangular shape together with the release film and then peeled from the release film. Consequently, a rectangular intermediate layer-producing green sheet was obtained.

(Process of Producing Exterior Battery Element)

A first laminate was produced as follows. The first laminate corresponds to a laminated block A1 shown in FIG. 9. First, the positive electrode active material layer-producing paste was applied on one main surface of the solid electrolyte layer-producing green sheet so that a square-shaped uncoated portion along four sides of this surface was formed, and then the exterior material-producing paste was applied on the square-shaped uncoated portion.

Next, the negative electrode layer-producing paste was applied on the other main surface of the solid electrolyte layer-producing green sheet so that a U-shaped uncoated portion along three sides of this surface was formed, and then the exterior material-producing paste was applied on the U-shaped uncoated portion. Consequently, the first laminate was obtained.

A second laminate was produced as follows. The second laminate corresponds to a laminated block A2 shown in FIG. 9. First, the positive electrode active material layer-producing paste was applied on one main surface of another solid electrolyte layer-producing green sheet so that a square-shaped uncoated portion along four sides of this surface was formed, and then the exterior material-producing paste was applied on the square-shaped uncoated portion. Subsequently, the positive electrode current corrector layer-producing paste was applied on a surface formed by these pastes so that a U-shaped uncoated portion along three sides of this surface was formed, and then the exterior material-producing paste was applied on the U-shaped uncoated portion.

Next, the negative electrode layer-producing paste was applied on the other main surface of another solid electrolyte layer-producing green sheet so that a U-shaped uncoated portion along three sides of this surface was formed, and then the exterior material-producing paste was applied on the U-shaped uncoated portion. The printing was adjusted so that the directions of the U-shaped uncoated portions on one main surface and the other main surface were directed to opposite directions to each other. Consequently, the second laminate was obtained.

Using the first and second laminates produced as described above, the exterior battery element 11 was produced as follows. First, the first and second laminates produced as described above were stacked such that a positive electrode active material layer-producing paste layer of the first laminate and a positive electrode current collector layer-producing paste layer of the second laminate were in contact with each other. Next, the intermediate layer-producing green sheet was disposed on each of both main surfaces of the laminate, and then the exterior material forming-green sheet was disposed on each of these intermediate layer-producing green sheets. After that, after the laminate was temporarily pressure-bonded at 50° C. or higher, an acrylic resin binder was burned at 300° C. or higher, and the lithium-containing oxide glass (A) and a ceramic powder contained in the laminate were sintered at 500° C. or lower. Consequently, the exterior battery element 11 was obtained.

(Process of Producing Terminal)

First, an Ag powder (Daiken Chemical Co., Ltd.) as a conductive particle powder and oxide glass (Bi-B based glass, ASF1096 manufactured by Asahi Glass Co., Ltd.) were mixed at a predetermined mass ratio. Next, the resulting mixture and an acrylic binder were mixed in a mass ratio of mixture (Ag powder+oxide glass):acrylic binder=70:30, and then this mixture was mixed with terpineol so that the solid content was 50% by mass. Then, the resulting mixture was stirred with 5 mmφ zirconia balls for 4 hours to obtain a conductive paste. Next, after this conductive paste was applied onto a release film, the conductive paste was attached to the first and second end surfaces 11SA and 11SB of the exterior battery element 11 and sintered at 400° C. for 1 hour to form the positive electrode terminal 12 and the negative electrode terminal 13. Thus, a target battery was obtained.

In the "Process of producing exterior battery element", a printing thickness of the positive electrode active material layer-producing paste was adjusted so that the average thickness $T_1$ of the positive electrode active material layer 21B obtained after sintering was 10 μm. Further, in the "Process of producing exterior battery element", a printing thickness of the negative electrode layer-producing paste was adjusted so that the average thickness $T_1$ of the negative electrode layer 22 obtained after sintering was 10 μm. In the "Process of producing intermediate layer-producing green sheet", a printing thickness of the intermediate layer-producing paste was adjusted so that the average thickness $T_2$ of each of the intermediate layers 15A and 15B obtained after sintering was 1.3 μm.

Example 2

Figure 10:
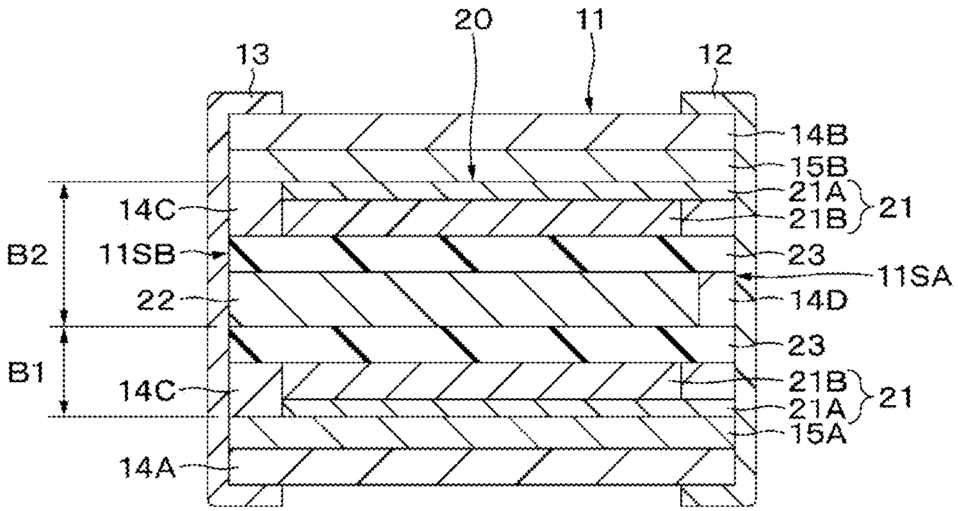
FIG. 10 is a sectional view showing a battery configuration according to Example 2.

In Example 2, a battery having the configuration shown in FIG. 10 was manufactured as follows. The pastes and green sheets for producing the battery were the same as those in Example 1.

A first laminate was produced as follows. The first laminate corresponds to a laminated block B1 shown in FIG. 10. First, the positive electrode active material layer-producing paste was applied on one main surface of the solid electrolyte layer-producing green sheet so that a square-shaped uncoated portion along four sides of this surface was formed, and then the exterior material-producing paste was applied on the square-shaped uncoated portion. Subsequently, the positive electrode current corrector layer-producing paste was applied on a surface formed by these pastes so that a U-shaped uncoated portion along three sides of this surface was formed, and then the exterior material-producing paste was applied on the U-shaped uncoated portion. Consequently, the first laminate was obtained.

A second laminate was obtained in the same manner as the second laminate of Example 1. The second laminate corresponds to a laminated block B2 shown in FIG. 10.

The first and second laminates produced as described above were stacked such that a solid electrolyte-producing green sheet of the first laminate and a negative electrode layer-producing paste layer of the second laminate were in contact with each other. The subsequent processes were performed in the same manner as in Example 1 to obtain the battery.

Example 3

In Example 3, a battery having the configuration shown in FIG. 1B was obtained as follows. That is, a battery was obtained in the same manner as in Example 1 except that the exterior battery element 11 was produced using only the second laminate of Example 1 as the laminate.

Example 4

A battery was obtained in the same manner as in Example 3 except that in the "Process of producing intermediate layer-producing green sheet", the printing thickness of the intermediate layer-producing paste was adjusted so that the average thickness $T_2$ of each of the intermediate layers 15A and 15B obtained after sintering was 0.5 μm.

Example 5

A battery was obtained in the same manner as in Example 4 except that the lithium-containing oxide glass (B) was used as the solid electrolyte in the "Process of producing intermediate layer-producing green sheet".

Example 6

In the "Process of producing positive electrode active material layer-producing paste", the printing thickness of the positive electrode active material layer-producing paste was adjusted so that the average thickness $T_1$ of the positive electrode active material layer 21B obtained after sintering was 20 μm. In the "Process of producing negative electrode layer-producing paste", the printing thickness of the negative electrode layer-producing paste was adjusted so that the average thickness $T_1$ of the negative electrode layer 22 obtained after sintering was 20 μm. A battery was obtained in the same manner as in Example 5 except for the above.

Example 7

In the "Process of producing positive electrode active material layer-producing paste", the printing thickness of the positive electrode active material layer-producing paste was adjusted so that the average thickness $T_1$ of the positive electrode active material layer 21B obtained after sintering was 5 μm. In the "Process of producing negative electrode layer-producing paste", the printing thickness of the negative electrode layer-producing paste was adjusted so that the average thickness $T_1$ of the negative electrode layer 22 obtained after sintering was 5 μm. In the "Process of producing intermediate layer-producing green sheet", the printing thickness of the intermediate layer-producing paste was adjusted so that the average thickness $T_2$ of each of the intermediate layers 15A and 15B obtained after sintering was 0.3 μm. A battery was obtained in the same manner as in Example 5 except for the above.

COMPARATIVE EXAMPLE 1

The lithium-containing oxide glass (C) was used as the solid electrolyte in the "Process of producing intermediate layer-producing green sheet". In the "Process of producing intermediate layer-producing green sheet", the printing thickness of the intermediate layer-producing paste was adjusted so that the average thickness $T_2$ of each of the intermediate layers 15A and 15B obtained after sintering was 51.3 μm. A battery was obtained in the same manner as in Example 3 except for the above.

Comparative Example 2

A battery was obtained in the same manner as in Example 3 except that in the "Process of producing intermediate layer-producing green sheet", the printing thickness of the intermediate layer-producing paste was adjusted so that the average thickness $T_2$ of each of the intermediate layers 15A and 15B obtained after sintering was 0.3 μm.

(Evaluation of Discharge Capacity Retention)

First, charge and discharge were performed under the following charge and discharge conditions, and a discharge capacity retention [%] after 50 cycles (=((50th cycle discharge capacity)/(1st cycle discharge capacity))×100) was calculated.

Measurement environment conditions: Dry air atmosphere, 23° C.

Charge condition: CCCV (Constant Current/Constant Voltage) 4.2V, 0.1 C/0.01 C cut Discharge condition: CC 2V, 0.1 C cut Next, the discharge capacity retentions of Examples 1 to 7 and Comparative Example 2 were converted into relative values based on the discharge capacity retention (100%) of Comparative Example 1.

(Evaluation of DCIR)

First, charge was performed under the following charge conditions, and DCIR was calculated by the following formula from a current change ΔA and a voltage change ΔV immediately after discharge under the following discharge conditions.

$$(\mathrm{DCIR}) = \Delta V / \Delta A$$

Measurement environment conditions: Dry air atmosphere, 23° C.

Charge condition: CCCV (Constant Current/Constant Voltage) 4.2V, 0.1 C/0.01 C cut Discharge condition: CC 2V, 0.1 C cut Next, the DCIRs of Examples 1 to 7 and Comparative Example 2 were converted into relative values based on the DCIR (100%) of Comparative Example 1.

TABLE 1

| | Uppermost electrode layer | Lowermost electrode layer | Ion conductivity of intermediate layer [S/cm] | T1 [μm] | T2 [μm] | R [%] | Charge-discharge efficiency [%] | DCIR [%] |
|---|---|---|---|---|---|---|---|---|
| Example 1 | Negative electrode layer | Negative electrode layer | $1 \times 10^{-7}$ | 10 | 1.3 | 13 | 157 | 66 |
| Example 2 | Positive electrode layer | Positive electrode layer | $1 \times 10^{-7}$ | 10 | 1.3 | 13 | 154 | 69 |
| Example 3 | Positive electrode layer | Negative electrode layer | $1 \times 10^{-7}$ | 10 | 1.3 | 13 | 152 | 70 |
| Example 4 | Positive electrode layer | Negative electrode layer | $1 \times 10^{-7}$ | 10 | 0.5 | 5 | 144 | 73 |
| Example 5 | Positive electrode layer | Negative electrode layer | $1 \times 10^{-8}$ | 10 | 0.5 | 5 | 132 | 80 |
| Example 6 | Positive electrode layer | Negative electrode layer | $1 \times 10^{-8}$ | 20 | 0.5 | 2.5 | 129 | 82 |
| Example 7 | Positive electrode layer | Negative electrode layer | $1 \times 10^{-8}$ | 5 | 0.3 | 6 | 125 | 90 |
| Comparative Example 1 | Positive electrode layer | Negative electrode layer | $1 \times 10^{-9}$ | 10 | 51.3 | 513 | 100 | 100 |
| Comparative Example 2 | Positive electrode layer | Negative electrode layer | $1 \times 10^{-7}$ | 10 | 0.3 | 3 | 90 | 120 |

T1: Average thickness of active material layer closest to intermediate layer

T2: Average thickness of intermediate layer

R: (T2/T1) × 100

From Table 1, the following can be seen.

When (a1) the lithium ion conductivities of the intermediate layers 15A and 15B are $1\times10^{-8}$ S/cm or more, (b2) the average thickness $T_2$ of each of the intermediate layers 15A and 15B is 0.3 μm or more, and (c3) of the active material layers included in the battery element 20, a ratio $((T_2/T_1)\times100)$ of the average thickness $T_1$ of the active material layer closest to the intermediate layers 15A and 15B and the average thickness $T_2$ of the intermediate layers 15A and 15B is 5% or more, it is possible to suppress the decrease in charge-discharge efficiency and the increase in internal resistance.

When (a2) the lithium ion conductivities of the intermediate layers 15A and 15B are $1\times10^{-8}$ S/cm or more, (b2) the average thickness $T_2$ of the intermediate layers 15A and 15B is 0.5 μm or more, and (c2) of the active material layers included in the battery element 20, a ratio $((T_2/T_1)\times100)$ of the average thickness $T_1$ of the active material layer closest to the intermediate layers 15A and 15B and the average thickness $T_2$ of the intermediate layers 15A and 15B is 2.5% or more, it is possible to suppress the decrease in charge-discharge efficiency and the increase in internal resistance.

Also when (a3) the lithium ion conductivities of the intermediate layers 15A and 15B are $1\times10^{-8}$ S/cm or more, and (b3) of the active material layers included in the battery element 20, the ratio $((T_2/T_1))\times100)$ of the average thickness $T_1$ of the active material layer closest to the intermediate layers 15A and 15B and the average thickness $T_2$ of the intermediate layers 15A and 15B is 5% or more, or the average thickness $T_2$ of the intermediate layers 15A and 15B is 0.5 μm or more, it is possible to suppress the decrease in charge-discharge efficiency and the increase in internal resistance.

5.2 Example Studying Average Thickness of Electrodes Located at Opposed Ends of Battery Element

Example 8

Figure 11:
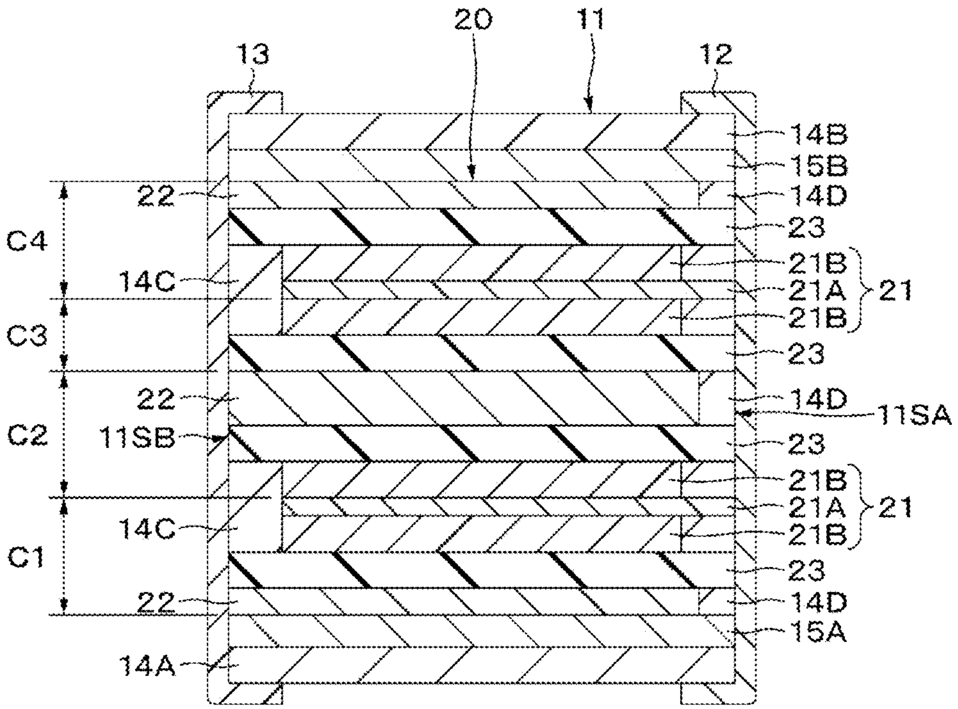
FIG. 11 is a sectional view showing a battery configuration according to Example 8.

In Example 8, a battery having the configuration shown in FIG. 11 was manufactured as follows. The pastes and green sheets for producing the battery were the same as those in Example 1.

First and fourth laminates were produced as follows. The first and fourth laminates correspond to laminated blocks C1 and C4 shown in FIG. 11. First, the positive electrode active material layer-producing paste was applied on one main surface of the solid electrolyte layer-producing green sheet so that a square-shaped uncoated portion along four sides of this surface was formed, and then the exterior material-producing paste was applied on the square-shaped uncoated portion. Subsequently, the positive electrode current corrector layer-producing paste was applied on a surface formed by these pastes so that a U-shaped uncoated portion along three sides of this surface was formed, and then the exterior material-producing paste was applied on the U-shaped uncoated portion.

Next, the negative electrode layer-producing paste was applied once on the other main surface of the solid electrolyte layer-producing green sheet so that a U-shaped uncoated portion along three sides of this surface was formed, and after one printed layer (coating layer) was formed, the exterior material-producing paste was applied on the U-shaped uncoated portion. The printing was adjusted so that the directions of the U-shaped uncoated portions on one main surface and the other main surface were directed to opposite directions to each other. Consequently, the first and fourth laminates were obtained.

A second laminate was produced as follows. The second laminate corresponds to a laminated block C2 shown in FIG. 11. First, the positive electrode active material layer-producing paste was applied on one main surface of the solid electrolyte layer-producing green sheet so that a square-shaped uncoated portion along four sides of this surface was formed, and then the exterior material-producing paste was applied on the square-shaped uncoated portion.

Next, the negative electrode layer-producing paste was applied twice on the other main surface of the solid electrolyte layer-producing green sheet so that a U-shaped uncoated portion along three sides of this surface was formed, and after two printed layers (coating layers) were stacked, the exterior material-producing paste was applied on the U-shaped uncoated portion. Consequently, the second laminate was obtained. An amount of the negative electrode layer-producing paste applied once (that is, a thickness of one printed layer) was similar to an amount of the negative electrode layer-producing paste applied once (that is, the thickness of one printed layer) during the production of the first and fourth laminates.

A third laminate was produced as follows. The third laminate corresponds to a laminated block C3 shown in FIG. 11. The positive electrode active material layer-producing paste was applied on one main surface of the solid electrolyte layer-producing green sheet so that a square-shaped uncoated portion along four sides of this surface was formed, and then the exterior material-producing paste was applied on the square-shaped uncoated portion. Consequently, the third laminate was obtained.

The first to fourth laminates produced as described above were stacked as follows. That is, the first to fourth laminates were stacked such that the positive electrode current collector layer-producing paste layer of the first laminate and the positive electrode active material layer-producing paste layer of the second laminate were in contact with each other, the negative electrode layer-producing paste layer of the second laminate and the solid electrolyte layer-producing green sheet of the third laminate were in contact with each other, and the positive electrode active material layer-producing paste layer of the third laminate and the positive electrode current collector layer-producing paste layer of the fourth laminate were in contact with each other. The subsequent processes were performed in the same manner as in Example 1 to obtain the battery.

Example 9

A battery was obtained in the same manner as in Example 8 except that in the process of producing the first and fourth laminates, the negative electrode layer-producing paste was applied twice on the other main surface of the solid electrolyte layer-producing green sheet, and two printed layers (coating layers) were formed. The amount of the negative electrode layer-producing paste applied once (that is, the thickness of one printed layer) was similar to the amount of the negative electrode layer-producing paste applied once during the production of the first and fourth laminates of Example 8.

(Evaluation of Initial Efficiency)

First, charge and discharge were performed under the same charge and discharge conditions as in the above-described “Evaluation of discharge capacity retention”, and the initial efficiency was obtained. Next, the initial efficiency of Example 8 was converted into a relative value based on the initial efficiency (100%) of Example 9.

TABLE 2

| | $ta_2$ [μm] | Initial efficiency [%] |
|---|---|---|
| Example 8 | $ta_1X(1/2)$ | 105 |
| Example 9 | $ta_1$ | 100 |

$ta_1$: Average thickness of negative electrode located at other than both ends of battery element in stacking direction
$ta_2$: Average thickness of negative electrode located at both ends of battery element in stacking direction Table 2 shows that when the average thickness $t_1$ of the negative electrode located at other than both the ends of the battery element 20 in the stacking direction and the average thickness $t_2$ of the negative electrode located at both the ends of the battery element 20 in the stacking direction satisfy $t_2=t_1\times(1/2)$, the initial efficiency can be improved.

6 APPLICATION EXAMPLE

6.1 Printed Circuit Board as Application Example

Hereinafter, a printed circuit board on which the battery according to any of the above-described first to third embodiments and their modification examples is mounted will be described.

Figure 12:
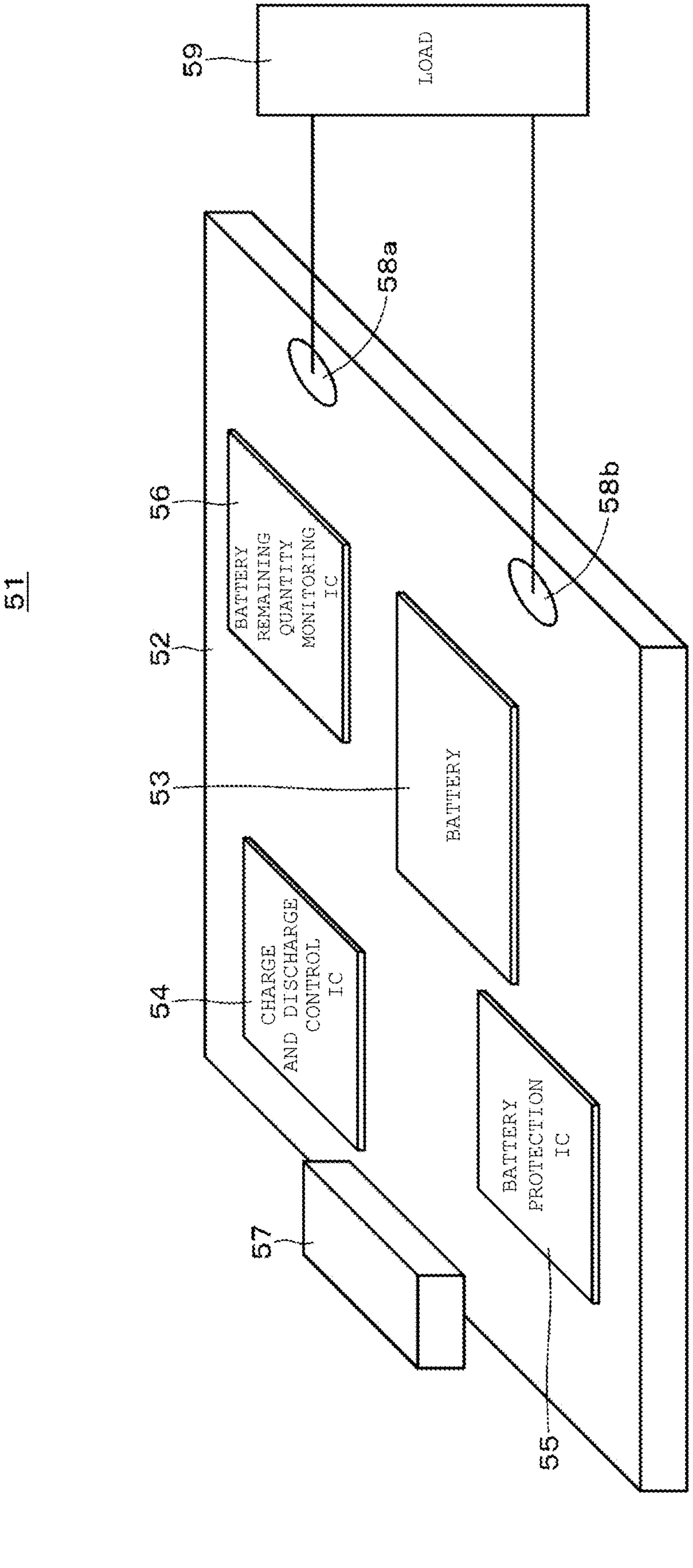
FIG. 12 is a schematic diagram showing an example of a configuration of a printed circuit board as Application Example.

FIG. 12 shows an example of a configuration of a printed circuit board 51. The printed circuit board 51 includes a substrate 52, a battery 53 provided on one side of the substrate 52, a charge and discharge control IC (integrated Circuit) 54, a battery protection IC 55, a battery remaining quantity monitoring IC 56, and a USB (Universal Serial Bus) interface 57.

The substrate 52 is, for example, a rigid substrate, a flexible substrate, a rigid flexible substrate, or the like. The battery 53 is a battery according to any of the above-described first to third embodiments and their modification examples. The charge and discharge control IC 54 is a control unit which controls a charge and discharge operation of the battery 53. The battery protection IC 55 is a control unit that controls the charge and discharge operation to prevent a charge voltage from being excessive during charging and discharging, or an overcurrent from flowing or an overdischarge from occurring due to a load short circuit. The battery remaining quantity monitoring IC 56 is a monitoring unit which monitors the battery remaining amount of the battery 53 and notifies a load (for example, host device) 59 and the like of the battery remaining amount.

The battery 53 is charged by electric power supplied from an external electric power source or the like via the USB interface 57. A predetermined electric power (for example, a voltage of 4.2 V) is supplied from the battery 53 to the load 59 via load connection terminals 58*a* and 58*b*. The USB interface 57 may be used for load connection.

Specific examples of the load 59 include, but are not limited to, wearable devices (sports watch, watch, hearing aid, and the like), IoT terminals (sensor network terminal and the like), amusement devices (portable game terminal, game controller), IC board embedded batteries (real time clock IC), and environmental power generation devices (electric power storage element for power generation elements such as photovoltaic power generation, thermoelectric power generation, and vibration power generation).

In the above-described application example, the case where the printed circuit board 51 is a single-sided board has been described, but the type of the printed circuit board 51 is not limited to the single-sided board and may be a double-sided board, a multilayer substrate, a buildup substrate, or the like. When the printed circuit board 51 is a double-sided board, the batteries 53 may be mounted on both sides, or the battery 53 may be mounted on one side. In the above-described application example, the case where the printed circuit board 51 includes one battery 53 has been described, but the printed circuit board 51 may include two or more batteries 53. In the above-described application example, the case where the printed circuit board 51 has a flat plate shape has been described, but the shape of the printed circuit board 51 is not limited to the flat plate shape, and the printed circuit board 51 may be curved into a spherical shape, an arch shape, or the like or may be bent.

6.2 Wristband-Type Electronic Device as Application Example

Hereinafter, a wristband-type electronic device including the battery according to any of the above-described first to third embodiments and their modification examples will be described. A wristband-type electronic device is also called a smart band, can acquire data relating to human activity, such as step count, moving distance, calorie consumption, sleep amount, and heart rate, by being wound around an arm. The acquired data can be managed by a smartphone or the like. Furthermore, the wristband-type electronic device can be provided with an email sending and receiving function and, for example, can notify the user of incoming email by an LED (Light Emitting Diode) lamp and/or vibration.

Figure 13:
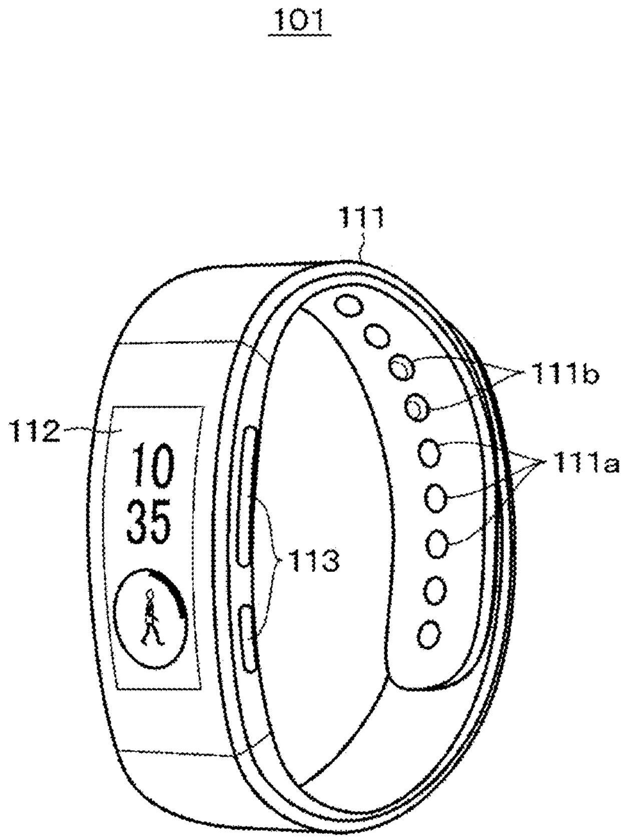
FIG. 13 is a perspective view showing an example of an appearance of a wristband-type electronic device as Application Example.

FIG. 13 shows an example of an appearance of a wristband-type electronic device 101. The electronic device 101 is a wearable device which is a watch type and detachably attached to a human body. The electronic device 101 includes a band portion 111 attached to an arm, a display device 112 for displaying numerals, characters, symbols, and the like, and an operation button 113. The band portion 111 is provided with a plurality of holes 111*a* and a protrusion 111*b* provided on an inner peripheral surface (a surface in contact with an arm when the electronic device 101 is mounted) side.

In a use state, the electronic device 101 is curved so that the band portion 111 has a substantially circular shape as shown in FIG. 13, and has the protrusion 111*b* inserted into the hole 111*a* so as to be attached to an arm. By adjusting a position of the hole 111*a* into which the protrusion 111*b* is inserted, degree of a diameter can be adjusted in accordance with a thickness of an arm. When the electronic device 101 is not in use, the protrusion 111*b* is removed from the hole 111*a*, and the band portion 111 is stored in a substantially flat state. A sensor (not shown) is provided inside the band portion 111 substantially over the whole of the band portion 111.

Figure 14:
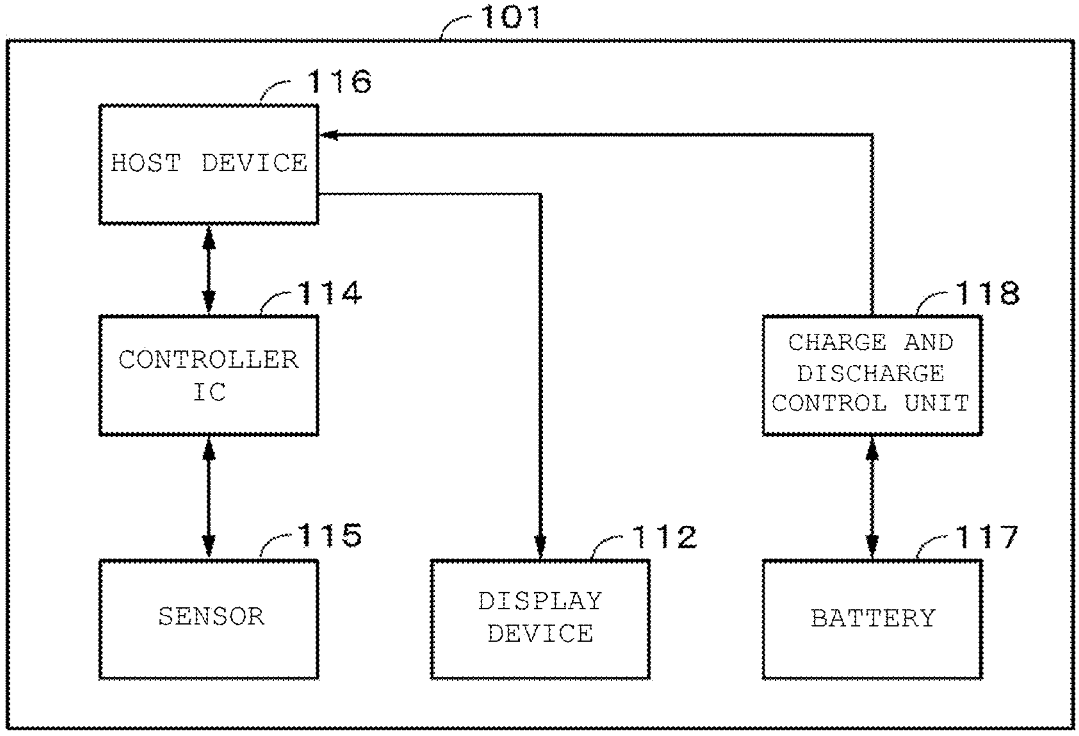
FIG. 14 is a block diagram showing an example of a configuration of the wristband-type electronic device as Application Example.

FIG. 14 shows an example of a configuration of the electronic device 101. The electronic device 101 includes a controller IC 114 as a drive control unit, a sensor 115, a host device 116, a battery 117 as an electric power source, and a charge and discharge control unit 118, in addition to the display device 112 described above. The sensor 115 may include the controller IC 114.

The sensor 115 can detect both pressing and bending. The sensor 115 detects a change in static capacitance according to the pressing, and outputs an output signal according to the change to the controller IC 114. In addition, the sensor 115 detects a change in a resistance value (change in resistance) according to the bending, and outputs an output signal according to the change to the controller IC 114. The controller IC 114 detects the pressing and bending of the sensor 115 based on the output signal from the sensor 115, and outputs information corresponding to the detection result to the host device 116.

The host device 116 executes various pieces of processing based on the information supplied from the controller IC 114. For example, processing such as display of character information and image information on the display device 112, movement of a cursor displayed on the display device 112, and scrolling of a screen are performed.

The display device 112 is, for example, a flexible display device, and displays a screen based on a video signal or a control signal supplied from the host device 116. Examples of the display device 112 include a liquid crystal display, an electro luminescence (EL) display, and an electronic paper, but are not limited thereto.

The battery 117 is a battery according to any of the above-described first to third embodiments and their modification examples. The charge and discharge control unit 118 controls the charge and discharge operation of the battery 117. Specifically, the charging of the battery 117 from an external electric power source or the like is controlled. In addition, the supply of electric power from the battery 117 to the host device 116 is controlled. The battery 117, the charge and discharge control unit 118, etc. may be mounted on a substrate such as a printed circuit board.

In the above-described application example, the case where the electronic device is the wristband-type electronic device 101 has been described, but the electronic device capable of using the battery according to the present invention is not limited thereto. Examples of the electronic device other than the above-described application example include a notebook personal computer, a tablet computer, a mobile phone (for example, a smart phone), a personal digital assistant (PDA), a display device (such as an LCD, an EL display, or electronic paper), an imaging device (for example, a digital still camera or a digital video camera), an audio device (for example, a portable audio player), a game device, an IC card such as a universal credit card (a card capable of functioning as a plurality of credit cards and point cards by a single card), a sensor network terminal, a smart watch, an eyeglass terminal (such as head mounted display (HMD)), a cordless handset phone machine, an electronic book, an electronic dictionary, a radio, a headphone, a navigation system, a memory card, a pacemaker, a hearing aid, an electric tool, an electric shaver, a refrigerator, an air conditioner, a television, a stereo, a water heater, a microwave oven, a dishwasher, a washing machine, a dryer, a lighting device, a toy, a medical device, a robot, a load conditioner, and a traffic signal. However, the electronic device is not limited thereto. The battery according to the present invention can also be applied to an electronic device having an IoT (Internet of Things) function, an electronic device having an AI (Artificial Intelligence) function, an electronic device using a principle of a quantum computer, and the like. These electronic devices can also be used in combination with an electric vehicle, an electric power storage system, or the like to be described later.

The wristband-type electronic device 101 may include the printed circuit board 51 instead of the battery 117 and the charge and discharge control unit 118. In this case, an electronic circuit included in the host device 116 and the controller IC 114 may be provided on the printed circuit board 51.

The electronic device described above as an example other than the wristband-type electronic device 101 may include the printed circuit board 51. In this case, an electronic circuit included in the electronic device may be provided on the printed circuit board 51.

6.3 Hybrid Vehicle As Application Example

Hereinafter, an electric power storage system for vehicle including the battery according to any of the above-described first to third embodiments and their modification examples will be described.

Figure 15:
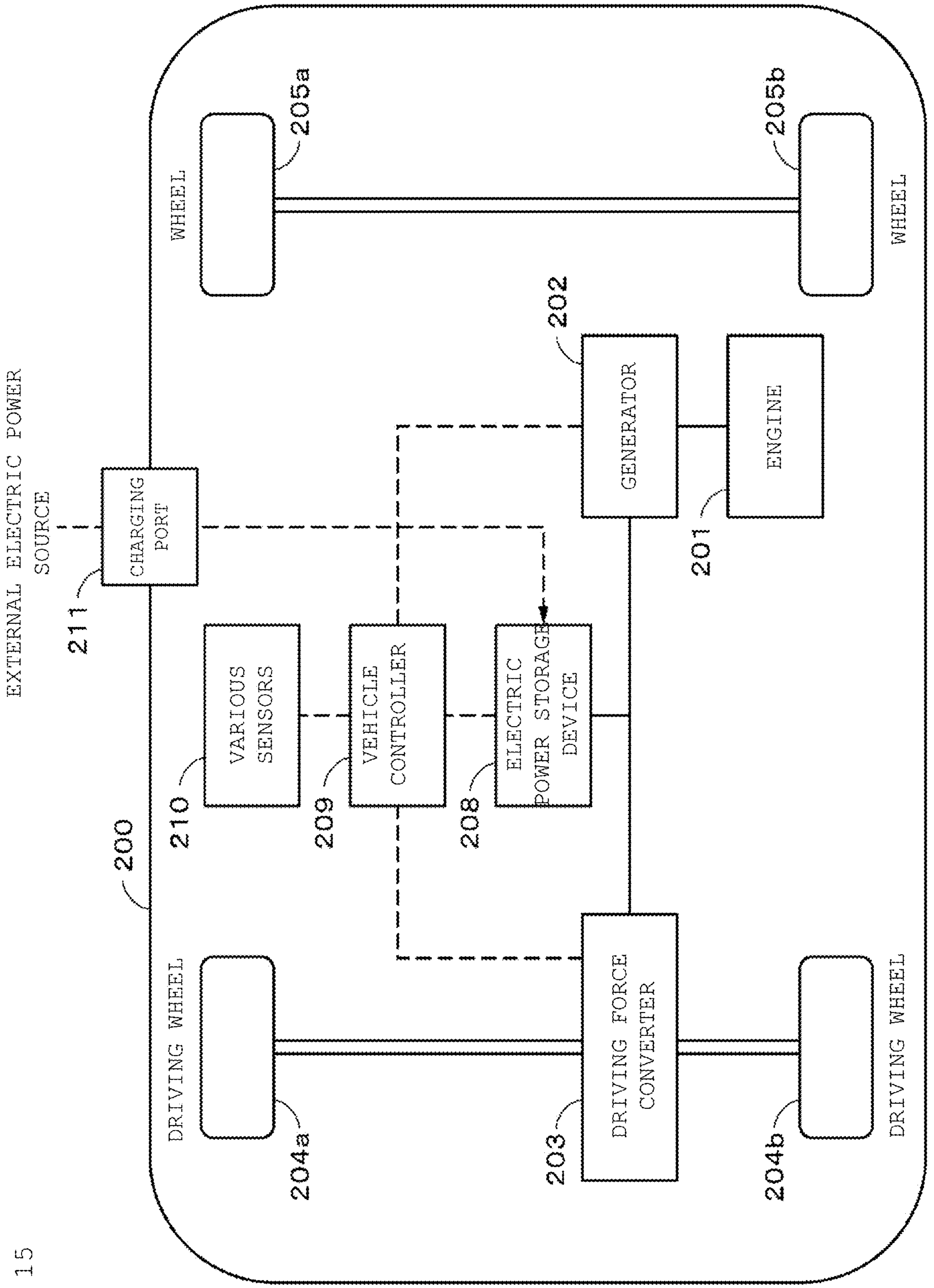
FIG. 15 is a schematic diagram showing an example of a configuration of a hybrid vehicle as Application Example.

FIG. 15 schematically shows a configuration of a hybrid vehicle employing a series hybrid system as the electric power storage system for a vehicle. The series hybrid system is a system travelling with an electric power driving force converter using electric power generated by a generator driven by an engine or electric power obtained by temporarily storing the generated electric power in a battery.

An engine 201, a generator 202, an electric power driving force converter 203, a driving wheel 204*a*, a driving wheel 204*b*, a wheel 205*a*, a wheel 205*b*, an electric power storage device 208, a vehicle controller 209, various sensors 210, and a charging port 211 are mounted in a hybrid vehicle 200. The electric power storage device 208 includes one or two or more of the batteries according to any of the above-described first to third embodiments and their modification examples.

The hybrid vehicle 200 travels using the electric power driving force converter 203 as a power source. An example of the electric power driving force converter 203 is a motor. The electric power driving force converter 203 acts by electric power of the electric power storage device 208, and a rotating force of the electric power driving force converter 203 is transmitted to the driving wheels 204*a* and 204*b*. Both an AC motor and a DC motor can be used as the electric power driving force converter 203 by using DC-AC conversion or reverse conversion (AC-DC conversion) at necessary portions. The various sensors 210 control an engine speed through the vehicle controller 209, or control an opening degree (throttle opening degree) of a throttle valve (not illustrated). The various sensors 210 include a velocity sensor, an acceleration sensor, an engine speed sensor, and the like.

A rotating force of the engine 201 is transmitted to the generator 202, and electric power generated by the generator 202 can be stored in the electric power storage device 208 by the rotating force.

When the hybrid vehicle is decelerated by a brake mechanism (not shown), a resistance force during the deceleration is added to the electric power driving force converter 203 as a rotating force, and regenerative electric power generated by the electric power driving force converter 203 due to this rotating force is stored in the electric power storage device 208.

By being connected to an external electric power source through the charging port 211, the electric power storage device 208 receives electric power from the external electric power source by using the charging port 211 as an input port, and can store the received electric power.

Although not shown, an information processing device for performing information processing relating to vehicle control based on information on a secondary battery may be included. An example of such an information processing device includes an information processing device for displaying a battery remaining amount based on information about the battery remaining amount.

In the above-described application example, the description has been made by exemplifying a series hybrid vehicle travelling with a motor using electric power generated by a generator driven by an engine or electric power obtained by temporarily storing the generated electric power in a battery, but the vehicle capable of using the battery according to the present invention is not limited thereto. For example, this vehicle may be a parallel hybrid vehicle in which the engine and the motor are used as driving sources and the three modes of traveling only with the engine, traveling only with the motor, and traveling with the engine and the motor are appropriately switched at the time of use, or may be an electric vehicle that runs on drive only by a driving motor without using an engine.

Further, in the above-described application example, the case where the electric power storage system is an electric power storage system for a vehicle has been described, but the electric power storage system capable of using the battery according to the present invention can be used is not limited to the electric power storage system for a vehicle and may be, for example, an electric power storage system for a residential house, industry, or the like.

DESCRIPTION OF REFERENCE SYMBOLS

11: Exterior battery element
11SA: First end surface
11SB: Second end surface
12: Positive electrode terminal
13: Negative electrode terminal
14A to 14D: Exterior material
15A, 15B: Intermediate layer
20: Battery element
21: Positive electrode layer
21A: Positive electrode current collector layer
21B: Positive electrode active material layer
22: Negative electrode layer
22A: Negative electrode current collector layer
22B: Negative electrode active material layer
23: Solid electrolyte layer
101: Wristband-type electronic device
117: Battery
200: Hybrid vehicle
208: Electric power storage device

The invention claimed is:

1. A battery comprising:
a battery element including an electrode layer;
an exterior material covering a surface of the battery element;
an intermediate layer disposed between the battery element and the exterior material and comprising a solid electrolyte,
wherein the intermediate layer is a separate and distinct layer from the battery element and the exterior material,
wherein a thickness of the intermediate layer is substantially uniform,
wherein respective ends of the electrode layer of the battery element, the exterior material, and the intermediate layer define an end face and
wherein the battery further includes an electrode terminal covering an entirety of the end face.

2. A battery comprising:
a battery element including an active material layer;
an exterior material covering a surface of the battery element;
an intermediate layer between the battery element and the exterior material and comprising a solid electrolyte,
wherein the intermediate layer is a separate and distinct layer from the battery element and the exterior material, wherein a lithium ion conductivity of the intermediate layer is $1\times10^{-8}$ S/cm or more, a ratio $((T_2/T_1)\times100)$ of an average thickness $T_1$ of the active material layer closest to the intermediate layer and an average thickness $T_2$ of the intermediate layer is 5% or more, respective ends of the active material layer of the battery element, the exterior material, and the intermediate layer define an end face; and the battery further includes an electrode terminal covering an entirety of the end face.

3. The battery according to claim 2, wherein an average thickness of the intermediate layer is 0.3 μm or more.

4. The battery according to claim 3, wherein the ratio $((T_2/T_1)\times100)$ is 10% or more.

5. The battery according to claim 2, wherein the lithium ion conductivity of the intermediate layer is $1\times10^{-7}$ S/cm or more.

6. The battery according to claim 2, wherein the ratio $((T_2/T_1)\times100)$ is 10% or more.

7. A battery comprising:

a battery element including an active material layer;

an exterior material covering a surface of the battery element; and an intermediate layer between the battery element and the exterior material and comprising a solid electrolyte, the intermediate layer being a separate and distinct layer from the battery element and the exterior material, wherein a lithium ion conductivity of the intermediate layer is $1\times10^{-8}$ S/cm or more, an average thickness of the intermediate layer is 0.5 μm or more, respective ends of the active material layer of the battery element, the exterior material, and the intermediate layer define an end face; and the battery further includes an electrode terminal covering an entirety of the end face.

8. The battery according to claim 7, wherein a ratio $((T_2/T_1)\times100)$ of an average thickness $T_1$ of the active material layer closest to the intermediate layer and an average thickness $T_2$ of the intermediate layer is 2.5% or more.

9. The battery according to claim 7, wherein the lithium ion conductivity of the intermediate layer is $1\times10^{-7}$ S/cm or more.

10. The battery according to claim 7, wherein the ratio $((T_2/T_1)\times100)$ is 10% or more.

11. The battery according to claim 1, wherein an average thickness of the intermediate layer is 1 μm or more.

12. The battery according to claim 1, wherein the exterior material comprises a ceramic.

13. The battery according to claim 1, further comprising an outermost exterior material covering at least a part of the battery element and the exterior material, wherein the outermost exterior material contains at least one material selected from an epoxy resin, a polyimide resin, a silicone resin, silicon oxide, and silicon nitride.

14. The battery according to claim 1, wherein the electrode layer is a first electrode layer and wherein the battery element further comprises a second electrode layer, and a solid electrolyte layer between the first electrode layer and the second electrode layer.

15. The battery according to claim 1, wherein the electrode layer is a first electrode layer and wherein the battery element comprises a plurality of alternating first electrode layers, second electrode layers, and solid electrolyte layers such that a respective solid electrolyte layer of the solid electrolyte layers is between each opposed first electrode layer and second electrode layer of the plurality of alternating first electrode layers and second electrode layers, the second electrode layers are arranged at opposed ends of the battery element in a stacking direction thereof, the second electrode layers include an active material layer, and an average thickness $t_1$ of a second electrode layer positioned at other than the opposed ends and an average thickness $t_2$ of the second electrode layers at the opposed ends satisfy a relationship $t_1\times(1/3)\leq t_2\leq t_1\times(2/3)$.

16. The battery according to claim 1, wherein the electrode layer is a first electrode layer and wherein the battery element comprises a plurality of alternating first electrode layers, second electrode layers, and solid electrolyte layers such that a respective solid electrolyte layer of the solid electrolyte layers is between each opposed first electrode layer and second electrode layer of the plurality of alternating first electrode layers and second electrode layers, the first electrode layers are arranged at opposed ends of the battery element in a stacking direction thereof, and the first electrode layers at the opposed ends include a current collector layer and an active material layer.

17. The battery according to claim 1, wherein the electrode layer is a first electrode layer and wherein the battery element comprises a plurality of alternating first electrode layers, second electrode layers, and solid electrolyte layers such that a respective solid electrolyte layer of the solid electrolyte layers is between each opposed first electrode layer and second electrode layer of the plurality of alternating first electrode layers and second electrode layers, the first electrode layer is arranged at a first end of the battery element in a stacking direction thereof, the second electrode layer is arranged at a second end of the battery element in the stacking direction thereof, the first electrode layer at the first end includes a current collector layer and an active material layer, the second electrode layer at the second end includes the active material layer, and an average thickness $t_1$ of the second electrode layer positioned at other than the second end and an average thickness $t_2$ of the second electrode layer positioned at the second end satisfy a relationship $t_1\times(1/3)\leq t_2\leq t_1\times(2/3)$.

18. The battery according to claim 1, wherein the electrode layer is a first electrode layer and wherein the battery element comprises a plurality of alternating first electrode layers, second electrode layers, and solid electrolyte layers such that a respective solid electrolyte layer of the solid electrolyte layers is between each opposed first electrode layer and second electrode layer of the plurality of alternating first electrode layers and second electrode layers, the first electrode layer is arranged at a first end of the battery element in a stacking direction thereof, the second electrode layer is arranged at a second end of the battery element in the stacking direction thereof, the first electrode layer at the first end includes a first current collector layer and a first active material layer, and the second electrode layer at the second end includes a second current collector layer and a second active material layer.

19. The battery according to claim 1, wherein the solid electrolyte contains oxide glass containing lithium (Li), silicon (Si), and boron (B).

20. The battery according to claim 19, wherein a glass transition temperature of the oxide glass is 550° C. or lower.

21. A circuit board having the battery according to claim 1 mounted thereof.

22. The circuit board according to claim 21, further comprising a charge and discharge control unit for controlling a charge and discharge of the battery mounted on the circuit board.

23. An electronic device comprising the battery according to claim 1, the electronic device configured to receive a supply of electric power from the battery.

24. An electric vehicle comprising:

the battery according to claim 1; and a converter that receives a supply of electric power from the battery and converts the power into a driving force for the vehicle.

25. The electric vehicle according to claim 24, further comprising a controller that performs information processing regarding vehicle control based on information regarding the battery.

26. A method of manufacturing a battery, the method comprising:

forming n first coating layers to produce a first electrode layer precursor;

forming 2n second coating layers to produce a second electrode layer precursor;

alternately stacking the n first coating layers and the 2n second coating layers with a solid electrolyte layer therebetween such as to produce a stacked structure having the first electrode layer precursor provided at a first end or opposed ends of the battery in a stacking direction and having the second electrode layer precursor provided at other than the opposed ends of the battery in the stacking direction;

stacking an exterior material green sheet on the stacked structure; and stacking an intermediate layer green sheet between the exterior material and the stacked structure such that respective ends of the exterior material green sheet and the intermediate layer green sheet define an end face, the intermediate layer green sheet being a separate and distinct layer from the exterior material green sheet; and forming an electrode terminal on an entirety of the end face, wherein n is an integer of 1 or more.

27. The method of manufacturing a battery according to claim 26, wherein the first electrode layer includes an active material layer.

28. The method of manufacturing a battery according to claim 27, wherein the first electrode layer is a negative electrode layer.

29. The method of manufacturing a battery according to claim 26, wherein a thickness of the first coating layer per layer and a thickness of the second coating layer per layer are the same.

30. The battery according to claim 1, wherein the respective ends of the electrode layer of the battery element, the exterior material, and the intermediate layer that define the end face are arranged so as to be aligned on a same surface.

* * * * *